United States Patent
Zhang et al.

(10) Patent No.: US 12,199,702 B2
(45) Date of Patent: Jan. 14, 2025

(54) MULTI-TRANSMISSION AND RECEIPT POINT (MULTI-TRP) ENHANCEMENT

(71) Applicant: Apple Inc., Cupertino, CA (US)

(72) Inventors: Yushu Zhang, Beijing (CN); Haitong Sun, Cupertino, CA (US); Wei Zeng, Cupertino, CA (US); Dawei Zhang, Cupertino, CA (US); Yuchul Kim, Cupertino, CA (US); Hong He, Cupertino, CA (US); Weidong Yang, San Diego, CA (US); Chunxuan Ye, San Diego, CA (US); Chunhai Yao, Beijing (CN); Oghenekome Oteri, San Diego, CA (US); Wei Zhang, Cupertino, CA (US); Jia Tang, Cupertino, CA (US); Tianyan Pu, Cupertino, CA (US); Pengkai Zhao, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/175,231

(22) Filed: Feb. 12, 2021

(65) Prior Publication Data
US 2021/0297114 A1    Sep. 23, 2021

(30) Foreign Application Priority Data
Feb. 12, 2020    (WO) ................ PCT/CN2020/074962

(51) Int. Cl.
*H04B 7/022*    (2017.01)
*H04L 5/00*    (2006.01)

(52) U.S. Cl.
CPC ............. *H04B 7/022* (2013.01); *H04L 5/001* (2013.01)

(58) Field of Classification Search
CPC ...... H04B 7/022; H04B 7/024; H04B 7/0671; H04L 5/001; H04L 5/0035
See application file for complete search history.

(56) References Cited

U.S. PATENT DOCUMENTS

| 6,519,231 B1 * | 2/2003 | Ding ....................... H04L 45/02 370/254 |
| 10,761,537 B1 * | 9/2020 | Ready-Campbell ........................ G05D 1/0219 |

(Continued)

FOREIGN PATENT DOCUMENTS

| CN | 104365054 | 2/2015 |
| CN | 107637120 | 1/2018 |

(Continued)

OTHER PUBLICATIONS

Apple Inc., "Remaining Issues on Multi-TRP Enhancement," 3GPP TSG RAN WG1 #99, R1-1912823, Nov. 18-22, 2019, 10 pages.

(Continued)

*Primary Examiner* — Christine Ng
(74) *Attorney, Agent, or Firm* — Fish & Richardson P.C.

(57) ABSTRACT

In an example method, a user equipment (UE) device determines one or more component carriers available to the UE device for at least one of transmitting or receiving data over a wireless network. The UE device transmits, to the wireless network, for each component carrier, an indication whether the component carrier supports at least one of transmitting or receiving data according to a multi-transmission and receiving points (multi-TRP) communication protocol.

21 Claims, 19 Drawing Sheets

*800*

Determine, by a UE device, one or more component carriers available to a UE device for at least one of transmitting or receiving data over a wireless network
802

Transmit, by the UE device to the wireless network, for each component carrier, an indication whether the component carrier supports at least one of transmitting or receiving data according to a multi-TRP communication protocol
804

(56) References Cited

U.S. PATENT DOCUMENTS

| | | | |
|---|---|---|---|
| 12,021,580 | B2 | 6/2024 | Zhang et al. |
| 2011/0019693 | A1* | 1/2011 | Fu .................... H04L 69/32 |
| | | | 370/469 |
| 2016/0150572 | A1* | 5/2016 | Quan .................. H04L 1/1607 |
| | | | 370/329 |
| 2016/0205699 | A1 | 7/2016 | Uchino et al. |
| 2017/0202004 | A1* | 7/2017 | Hurd .................... H04W 28/10 |
| 2017/0251461 | A1* | 8/2017 | Parkvall ............... H04W 72/20 |
| 2019/0363843 | A1 | 11/2019 | Gordaychik |
| 2019/0379506 | A1 | 12/2019 | Cheng |
| 2020/0015229 | A1 | 1/2020 | Yang et al. |
| 2020/0336892 | A1* | 10/2020 | Khoshnevisan ...... H04L 1/1854 |
| 2020/0351055 | A1* | 11/2020 | Manolakos ......... H04B 7/0408 |
| 2021/0037502 | A1* | 2/2021 | Tsai .................... H04W 72/02 |
| 2021/0045142 | A1* | 2/2021 | Joseph .............. H04W 28/0278 |
| 2021/0321355 | A1* | 10/2021 | Gao .................. H04W 56/0045 |
| 2021/0345315 | A1 | 11/2021 | Kakishima et al. |
| 2021/0377923 | A1* | 12/2021 | Ge ..................... H04W 72/1263 |
| 2023/0246673 | A1 | 8/2023 | Zhang et al. |

FOREIGN PATENT DOCUMENTS

| | | |
|---|---|---|
| WO | WO 2019097478 | 5/2019 |
| WO | WO 2020024297 | 2/2020 |

OTHER PUBLICATIONS

CATT, "Remaining issues on multi-TRP/panel transmission," 3GPP TSG RAN WG1 #99, R1-1912176, Reno, USA, Nov. 18-22, 2019, 21 pages.

International Search Report and Written Opinion in International Appln. No. PCT/CN2020/074962, dated Nov. 17, 2020, 10 pages.

Qualcomm Incorporated, "Multi-TRP Enhancements," 3GPP TSG-RAN WG1 Meeting #99, R1-1912967, Reno, Nevada, USA, Nov. 18-22, 2019, 21 pages.

Vivo, "Remaining issues on multi-TRP/panel transmission," 3GPP TSG RAN WG1 #99 R1-1912039, Reno, USA, Nov. 18-22, 2019, 11 pages.

International Preliminary Report on Patentability in International Appln. No. PCT/US2020/074962, dated Aug. 25, 2022, 7 pages.

NTT Docomo et al., "Views on testability for URLLC performance requirements," 3GPP TSG-RAN WG4 Meeting #92, R4-1909894, Ljubljana, Slovenia, Aug. 26-30, 5 pages.

Qualcomm Incorporated, "Multi-TRP Enhancements," 3GPP TSG-RAN WG1 Meeting #96b, R1-1905026, Apr. 8-12, 2019, 15 pages.

Qualcomm Incorporated, "Multi-TRP Enhancements," 3GPP TSG-RAN WG1 Meeting #98, R1-1909272, Aug. 26-30, 2019, Prague, Czech Republic, 29 pages.

Ericsson, "Finalizing issues for mTRP," 3GPP TSG-RAN WG1 Meeting #99, Tdoc R1-1912656, Reno, Nevada, USA, Nov. 18-22, 2019, 17 pages.

OPPO, "Enhancements on multi-TRP and multi-panel transmission," 3GPP TSG RAN WG1 Meeting #96bis, R1-1904036, Xi'an, China, Apr. 8-12, 2019, # pages.

* cited by examiner

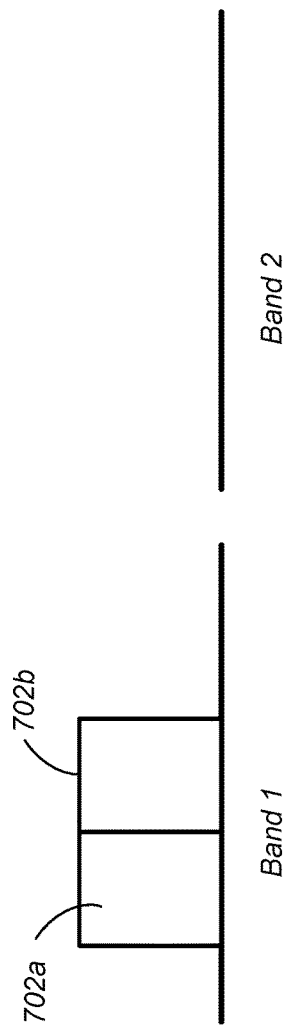
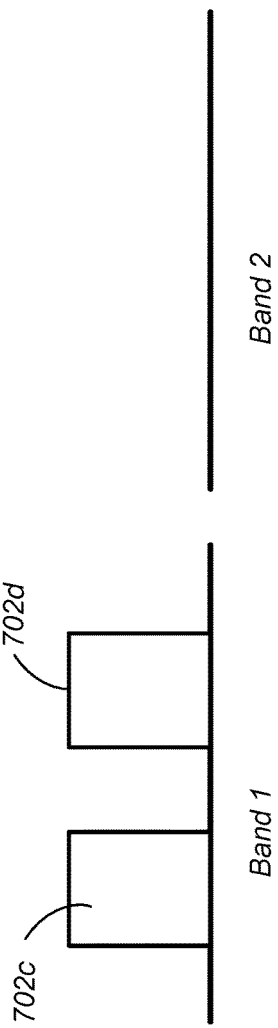
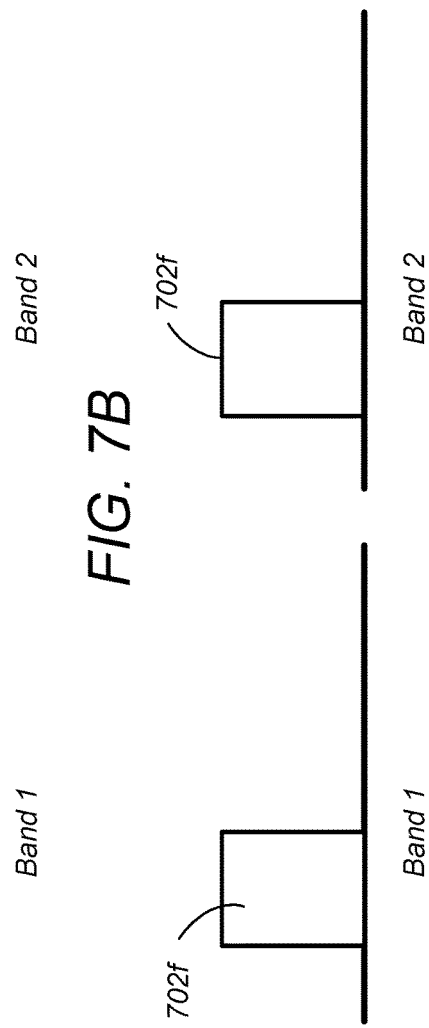
FIG. 7A
FIG. 7B
FIG. 7C

```
                            ┌─ 800
                            ▼

┌─────────────────────────────────────────────────────┐
│  *Determine, by a UE device, one or more component carriers*  │
│   *available to a UE device for at least one of transmitting or*  │
│        *receiving data over a wireless network*         │
│                       *802*                         │
└─────────────────────────────────────────────────────┘
                            │
                            ▼
┌─────────────────────────────────────────────────────┐
│  *Transmit, by the UE device to the wireless network, for each*  │
│  *component carrier, an indication whether the component carrier*  │
│  *supports at least one of transmitting or receiving data according*  │
│           *to a multi-TRP communication protocol*          │
│                       *804*                         │
└─────────────────────────────────────────────────────┘
```

Determine a plurality of CORESETs available to TRPs of a wireless network for at least one of transmitting or receiving data over the wireless network
812

↓

Generate resource allocation assignments for the TRPs of the wireless network
814

↓

Allocate network resources to the TRPs of the wireless network according to the resource allocation assignments
816

┌─────────────────────────────────────────────┐
│ Receive, by a user equipment (UE) device, control information │
│ regarding a transmission scheme of a wireless network │
│ 822 │
└─────────────────────────────────────────────┘
                        ↓
┌─────────────────────────────────────────────┐
│ Select a transmission scheme for transmitting the data to the │
│ wireless network │
│ 824 │
└─────────────────────────────────────────────┘
                        ↓
┌─────────────────────────────────────────────┐
│ Transmit the data to the wireless network according to the │
│ selected transmission scheme │
│ 826 │
└─────────────────────────────────────────────┘

```
┌─────────────────────────────────────────────┐
│ Transmit, from a base station to a UE device, control information │
│ regarding a transmission scheme of a wireless network │
│ 832 │
└─────────────────────────────────────────────┘
                        ↓
┌─────────────────────────────────────────────┐
│ Receive, at the base station from the UE device over the wireless │
│ network, data according to a transmission scheme selected by │
│ the UE device │
│ 834 │
└─────────────────────────────────────────────┘
```

Transmit, from a base station to UE device, control information regarding a transmission scheme of a wireless network
852

Receive, at the base station from the UE device over the wireless network, data according to a transmission scheme selected by the UE device
854

```
┌─────────────────────────────────────────────┐
│ Transmit, from a base station to a UE device, control information │
│ regarding a transmission scheme of a wireless network │
│                    872                      │
└─────────────────────────────────────────────┘
                      │
                      ▼
┌─────────────────────────────────────────────┐
│ Transmit, from the base station to the UE device over the │
│ wireless network, data according to a transmission scheme │
│ selected by the UE device │
│                    874                      │
└─────────────────────────────────────────────┘
```

```
┌─────────────────────────────────────────────┐
│ Transmit, from a base station to a user     │
│ equipment (UE) device, control information  │
│ regarding a transmission scheme of a        │
│ wireless network                            │
│ 892                                         │
└─────────────────────────────────────────────┘
                      ↓
┌─────────────────────────────────────────────┐
│ Transmit, from the base station to the UE   │
│ device over the wireless network, data      │
│ according to a transmission scheme          │
│ selected by the UE device,                  │
│ 894                                         │
└─────────────────────────────────────────────┘
```

Transmit, from a base station to a user equipment (UE) device, control information regarding a transmission scheme of a wireless network
914

Receive, at the base station from the UE device over the wireless network, data according to a transmission scheme selected by the UE device
916

MULTI-TRANSMISSION AND RECEIPT POINT (MULTI-TRP) ENHANCEMENT

TECHNICAL FIELD

The present application relates to wireless devices, and more particularly to apparatus, systems, and methods for a wireless device to establish and maintain concurrent connections with current radio access technologies and next generation radio access technologies.

BACKGROUND

Wireless communication systems are rapidly growing in usage. Further, wireless communication technology has evolved from voice-only communications to also include the transmission of data, such as Internet and multimedia content. Thus, improvements in the field are desired.

SUMMARY

In an aspect, a method includes determining, by a user equipment (UE) device, one or more component carriers available to the UE device for at least one of transmitting or receiving data over a wireless network; and transmitting, by the UE device to the wireless network, for each component carrier, an indication whether the component carrier supports at least one of transmitting or receiving data according to a multi-transmission and receiving points (multi-TRP) communication protocol.

Implementations of this aspect can include one or more of the following features.

In some implementations, according to the multi-TRP communication protocol, the UE device can be configured to transmit a first instance of data to a first TRP of the wireless network, and transmit a second instance of data to a second TRP of the wireless network.

In some implementations, according to the multi-TRP communication protocol, the UE device can be configured to receive a first instance of data from a first TRP of the wireless network, and receive a second instance of data from a second TRP of the wireless network.

In some implementations, for each component carrier, the indication whether the component carrier supports at least one of transmitting or receiving data according to the multi-TRP communication protocol can include a first data item indicating whether the component carrier supports transmitting data according to the multi-TRP communication protocol, and a second data item indicating whether the component carrier supports receiving data according to the multi-TRP communication protocol.

In some implementations, the method can further include receiving, by a base station of the wireless network, for each component carrier, the indication whether the component carrier supports at least one of transmitting or receiving data according to the multi-TRP communication protocol; determining, by the base station, that a first component carrier of the one or more component carriers supports at least one of transmitting or receiving data according to the multi-TRP communication protocol; and responsive to determining that the first component carrier supports at least one of transmitting or receiving data according to the multi-TRP communication protocol, allotting a first resource cost to the first component carrier.

In some implementations, the method can further include determining, by the base station, that a second component carrier of the one or more component carriers does not support at least one of transmitting or receiving data according to the multi-TRP communication protocol; and responsive to determining that the second component carrier does not support at least one of transmitting or receiving data according to the multi-TRP communication protocol, allotting a second resource cost to the second component carrier, the first resource cost being greater than the second resource cost.

In some implementations, each of the first resource cost and the second resource cost can correspond to a number of component carriers that the UE device can support during carrier aggregation.

In some implementations, for each component carrier, the indication whether the component carrier supports at least one of transmitting or receiving data according to the multi-TRP can include a data item indicating a resource cost associated with transmitting data using the control channel according to the multi-TRP communication protocol.

In some implementations, the resource cost can be an integer value.

In some implementations, the resource cost can be a non-integer value.

In another aspect, a method includes determining, by a base station of a wireless network, a plurality of control resource sets (CORESETs) available to transmit and receive points (TRPs) of the wireless network for at least one of transmitting or receiving data over the wireless network; and generating, by the base station, resource allocation assignments for the TRPs of the wireless network. Generating the resource allocation assignments includes, for each of the CORESETs, associating the CORESET with one or more respective logical identifiers. Each logical identifier corresponds to a different respective TRP of the wireless network. At least one of the CORESETs is associated with two respective logical identifiers. The method also includes allocating, by the base station, network resources to the TRPs of the wireless network according to the resource allocation assignments.

Implementations of this aspect can include one or more of the following features.

In some implementations, allocating network resources to the TRPs of the wireless network can include determining that a first CORESET is associated with a single logical identifier, and allocating a first amount of network resources with respect to the first CORESET.

In some implementations, allocating network resources to the base stations of the wireless network can include determining that a second CORESET is associated with multiple logical identifiers, and allocating a second amount of network resources with respect to the second CORESET. The second amount of network resources can be greater than the first amount of network resources.

In some implementations, generating the resource allocation assignments can include, for each the logical identifiers, enumerating each of the CORESETs associated with that logical identifier.

In some implementations, the plurality of CORESETs can be distributed among a plurality of different groups with respect to the frequency domain and the time domain. A first logical identifier can be associated with a first subset of CORESETs, where the first subset of CORESETs are associated with a first group with respect to the frequency domain and the time domain. A second logical identifier can be associated with a second subset of CORESETs, where the second subset of CORESETs are associated with the first group with respect to the frequency domain and the time domain. The first subset of CORESETs and the second subset of CORESETs can be non-mutually exclusive.

In some implementations, the plurality of CORESETs can be distributed among a plurality of different groups with respect to the frequency domain and the time domain. A first logical identifier is associated with a first subset of CORESETs, where the first subset of CORESETs are associated with a first group with respect to the frequency domain and the time domain. A second logical identifier can be associated with a second subset of CORESETs, where the second subset of CORESETs are associated with the first group with respect to the frequency domain and the time domain. The first subset of CORESETs and the second subset of CORESETs can be mutually exclusive.

In some implementations, a first CORESET can be common to the first subset of CORESETs and the second subset of CORESETs. A second CORESET can be included in one of the first subset of CORESETs or the second subset of CORESETs. The method can further include allocating a first amount of network resources with respect to the first CORESET, and allocating a second amount of network resources with respect to the second CORESET. The first amount of network resources can be greater than the second amount of network resources.

In another aspect, a method includes receiving, by a user equipment (UE) device, control information regarding a transmission scheme of a wireless network. The control information includes at least an indication of a number of transmission configuration indication (TCI) states associated with the transmission, an indication of a number of code division multiplexing (CDM) groups associated with the transmission, and an indication of a number of repetitions by which to transmit the data. The method also includes selecting a transmission scheme for transmitting the data to the wireless network. Selecting the transmission scheme includes selecting a first transmission scheme when the number of TCI states is one and at least one of a first set of criteria or a second set of criteria are satisfied. The first set of criteria is satisfied when the number of repetitions by which to transmit the data is greater than one. The second set of criteria is satisfied when the number of repetitions by which to transmit the data is greater than one and the number of CDM groups is one. Selecting the transmission scheme also includes selecting a second transmission scheme when the number of TCI states is one and neither the first set of criteria nor the second set of criteria are satisfied. The method also includes transmitting the data to the wireless network according to the selected transmission scheme.

Implementations of this aspect can include one or more of the following features.

In some implementations, the first transmission scheme can be an inter-slot repetition time division multiplexing (TDM) transmission scheme.

In some implementations, the first transmission scheme can be an inter-slot repetition TDM transmission scheme performed with respect to less than or equal to two transmission ports.

In some implementations, the second transmission scheme can be a transmission scheme without data repetition.

In another aspect, a method includes transmitting, from a base station to a user equipment (UE) device, control information regarding a transmission scheme of a wireless network. The control information includes at least an indication of a number of transmission configuration indication (TCI) states associated with the transmission, an indication of a number of code division multiplexing (CDM) groups associated with the transmission, and an indication of a number of repetitions by which to transmit the data. The method also includes receiving, at the base station from the UE device over the wireless network, data according to a transmission scheme selected by the UE device. A first transmission scheme is selected based on a determination by the UE device that the number of TCI states is one and at least one of a first set of criteria or a second set of criteria are satisfied. A second transmission scheme is selected when the number of TCI states is one and neither the first set of criteria nor the second set of criteria are satisfied. The first set of criteria is satisfied when the number of repetitions by which to transmit the data is greater than one. The second set of criteria is satisfied when the number of repetitions by which to transmit the data is greater than one and the number of CDM groups is one.

Implementations of this aspect can include one or more of the following features.

In some implementations, the first transmission scheme can be an inter-slot repetition time division multiplexing (TDM) transmission scheme.

In some implementations, the first transmission scheme can be an inter-slot repetition TDM transmission scheme performed with respect to less than or equal to two transmission ports.

In some implementations, the second transmission scheme can be a transmission scheme without data repetition.

In another aspect, a method includes receiving, by a user equipment (UE) device, control information regarding a transmission scheme of a wireless network. The control information includes at least an indication of a number of transmission configuration indication (TCI) states associated with the transmission. The method also includes selecting a transmission scheme for transmitting the data to the wireless network.

Selecting the transmission scheme includes selecting a first transmission scheme when the number of TCI states is one and a first set of criteria are satisfied. The first set of criteria is satisfied when the control information indicates that a number of repetitions by which to transmit the data is greater than one and the control information does not include an indication of a transmission scheme to be used for the transmission.

Selecting the transmission scheme includes selecting a second transmission scheme when the number of TCI states is one and a second set of criteria are satisfied. The second set of criteria is satisfied when the control information does not indicate the number of repetitions by which to transmit the data and the control information includes an indication that an intra-slot repetition time division multiplexing (TMD) transmission scheme be used for the transmission.

Selecting the transmission scheme includes selecting a third transmission scheme when the number of TCI states is one and a third set of criteria are satisfied. The third set of criteria is satisfied when the control information indicates that the number of repetitions by which to transmit the data is greater than one and the control information indicates that the intra-slot TDM transmission scheme be used for the transmission.

Selecting the transmission scheme includes selecting a fourth transmission scheme when the number of TCI states is one and neither the first set of criteria, the second set of criteria, nor the third set of criteria are satisfied.

The method also includes transmitting the data to the wireless network according to the selected transmission scheme.

Implementations of this aspect can include one or more of the following features.

In some implementations, the first transmission scheme can be an inter-slot repetition time division multiplexing (TDM) transmission scheme.

In some implementations, the second transmission scheme can be the intra-slot repetition TDM transmission scheme.

In some implementations, the third transmission scheme can be one of the inter-slot repetition TDM transmission scheme, the intra-slot repetition TDM transmission scheme, or a transmission scheme without data repetition.

In some implementations, the fourth transmission scheme can be a transmission scheme without data repetition.

In another aspect, a method includes transmitting, from a base station to a user equipment (UE) device, control information regarding a transmission scheme of a wireless network. The control information includes at least an indication of a number of transmission configuration indication (TCI) states associated with the transmission. The method also includes receiving, at the base station from the UE device over the wireless network, data according to a transmission scheme selected by the UE device.

The UE device selects a first transmission scheme when the number of TCI states is one and a first set of criteria are satisfied. The first set of criteria is satisfied when the control information indicates that a number of repetitions by which to transmit the data is greater than one and the control information does not include an indication of a transmission scheme to be used for the transmission.

The UE device selects a second transmission scheme when the number of TCI states is one and a second set of criteria are satisfied. The second set of criteria is satisfied when the control information does not indicate the number of repetitions by which to transmit the data and the control information includes an indication that an intra-slot repetition time division multiplexing (TMD) transmission scheme be used for the transmission.

The UE device selects a third transmission scheme when the number of TCI states is one and a third set of criteria are satisfied. The third set of criteria is satisfied when the control information indicates that the number of repetitions by which to transmit the data is greater than one and the control information indicates that the intra-slot repetition time division multiplexing (TMD) transmission scheme be used for the transmission.

The UE device selects a fourth transmission scheme when the number of TCI states is one and neither the first set of criteria, the second set of criteria, nor the third set of criteria are satisfied.

Implementations of this aspect can include one or more of the following features.

In some implementations, the first transmission scheme can be an inter-slot repetition time division multiplexing (TDM) transmission scheme.

In some implementations, the second transmission scheme can be an intra-slot repetition TDM transmission scheme.

In some implementations, the third transmission scheme can be one of the inter-slot repetition TDM transmission scheme, the intra-slot repetition TDM transmission scheme, or a transmission scheme without data repetition.

In some implementations, the fourth transmission scheme can be a transmission scheme without data repetition.

In another aspect, a method includes receiving, by a user equipment (UE) device, control information regarding a transmission scheme of a wireless network. The control information includes at least an indication of a number of transmission configuration indication (TCI) states associated with the transmission, and an indication of a number of code division multiplexing (CDM) groups associated with the transmissions. The method also includes determining that the number of TCI states is two and the number of CDM groups is two; and responsive to determining that the number of TCI states is two and the number of CDM groups is two, receiving the data from the wireless network according to a non-coherent joint transmission (NCJT) transmission scheme.

Implementations of this aspect can include one or more of the following features.

In some implementations, according to the NCJT transmission scheme, two physical downlink shared channels (PDSCHs) transmitted through the wireless network can be permitted to at least partially overlap in at least one of a frequency domain or a time domain.

In another aspect, a method includes transmitting, from a base station to a user equipment (UE) device, control information regarding a transmission scheme of a wireless network. The control information includes at least an indication of a number of transmission configuration indication (TCI) states associated with the transmission, and an indication of a number of code division multiplexing (CDM) groups associated with the transmissions. The method also includes transmitting, from the base station to the UE device over the wireless network, data according to a transmission scheme selected by the UE device. The UE device selects a non-coherent joint transmission (NCJT) transmission scheme upon determining that the number of TCI states is two and the number of CDM groups is two.

Implementations of this aspect can include one or more of the following features.

In some implementations, according to the NCJT transmission scheme, two physical downlink shared channels (PDSCHs) transmitted through the wireless network can be permitted to at least partially overlap in at least one of a frequency domain or a time domain.

In another aspect, a method includes receiving, by a user equipment (UE) device, control information regarding a transmission scheme of a wireless network. The control information includes at least an indication of a number of transmission configuration indication (TCI) states associated with the transmission, an indication of a number of code division multiplexing (CDM) groups associated with the transmissions, and an indication of a number of repetitions of the transmitted data. The method also includes selecting a transmission scheme for receiving the data from the wireless network. Selecting the transmission scheme includes (i) selecting a first transmission scheme when the number of TCI states is two, the number of CDM groups is one, and the number of repetitions of the transmitted data is greater than one, or (ii) selecting a second transmission scheme from among a plurality of candidate transmission schemes when the number of TCI states is two, the number of CDM groups is one, and the number of repetitions of the transmitted data is not greater than one. The method also includes receiving the data from the wireless network according to the selected transmission scheme.

Implementations of this aspect can include one or more of the following features.

In some implementations, the first transmission scheme can be an inter-slot repetition time division multiplexing (TDM) transmission scheme.

In some implementations, the plurality of candidate transmission schemes can include an a frequency division multiplexing (FDM) single transport block (TB) transmission scheme, a FDM dual TB transmission scheme, and an intra-slot repetition TDM transmission scheme.

In another aspect, a method includes transmitting, from a base station to a user equipment (UE) device, control information regarding a transmission scheme of a wireless network. The control information includes at least an indication of a number of transmission configuration indication (TCI) states associated with the transmission, an indication of a number of code division multiplexing (CDM) groups associated with the transmissions, and an indication of a number of repetitions of the transmitted data. The method also includes transmitting, from the base station to the UE device over the wireless network, data according to a transmission scheme selected by the UE device. The UE device selects a first transmission scheme when the number of TCI states is two, the number of CDM groups is one, and the number of repetitions of the transmitted data is greater than one. The UE device selects a second transmission scheme from among a plurality of candidate transmission schemes when the number of TCI states is two, the number of CDM groups is one, and the number of repetitions of the transmitted data is not greater than one.

Implementations of this aspect can include one or more of the following features.

In some implementations, the first transmission scheme can be an inter-slot repetition time division multiplexing (TDM) transmission scheme.

In some implementations, the plurality of candidate transmission schemes can include an a frequency division multiplexing (FDM) single transport block (TB) transmission scheme, a FDM dual TB transmission scheme, and an intra-slot repetition TDM transmission scheme.

In another aspect, a method includes receiving, by a user equipment (UE) device, control information regarding a transmission scheme of a wireless network. The control information includes at least an indication of a number of transmission configuration indication (TCI) states associated with the transmission, an indication of a number of code division multiplexing (CDM) groups associated with the transmissions, an indication of a number of repetitions of the transmitted data, and an indication of the transmission scheme of the wireless network. The method also includes selecting a transmission scheme for receiving the data to the wireless network. Selecting the transmission scheme includes selecting a first transmission scheme when the number of TCI states is two, the number of CDM groups is one, and the control information indicates the first transmission scheme for the wireless network. Selecting the transmission scheme also includes selecting a second transmission scheme when the number of TCI states is two, the number of CDM groups is one, and the control information indicates the second transmission scheme for the wireless network. Selecting the transmission scheme also includes selecting a third transmission scheme when the number of TCI states is two, the number of CDM groups is one, and the control information indicates the third transmission scheme for the wireless network. Selecting the transmission scheme also includes selecting a fourth transmission scheme when the number of TCI states is two, the number of CDM groups is one, the number of repetitions by which to transmit the data is greater than one, and one of (i) the control information does not indicate the first, second, or third transmission schemes or (ii) the control information does not indicate a transmission scheme. The method also includes transmitting the data to the wireless network according to the selected transmission scheme.

Implementations of this aspect can include one or more of the following features.

In some implementations, the first transmission scheme can be a frequency division multiplexing (FDM) single transport block (TB) transmission scheme.

In some implementations, the second transmission scheme can be an FDM dual TB transmission scheme.

In some implementations, the third transmission scheme can be an intra-slot repetition TDM transmission scheme.

In some implementations, the fourth transmission scheme can be an inter-slot repetition TDM transmission scheme.

In another aspect, a method includes transmitting, from a base station to a user equipment (UE) device, control information regarding a transmission scheme of a wireless network. The control information includes at least an indication of a number of transmission configuration indication (TCI) states associated with the transmission, an indication of a number of code division multiplexing (CDM) groups associated with the transmissions, an indication of a number of repetitions of the transmitted data, and an indication of the transmission scheme of the wireless network. The method also includes receiving, at the base station from the UE device over the wireless network, data according to a transmission scheme selected by the UE device. The UE device selects a first transmission scheme when the number of TCI states is two, the number of CDM groups is one, and the control information indicates the first transmission scheme for the wireless network. The UE device selects a second transmission scheme when the number of TCI states is two, the number of CDM groups is one, and the control information indicates the second transmission scheme for the wireless network. The UE device selects a third transmission scheme when the number of TCI states is two, the number of CDM groups is one, and the control information indicates the third transmission scheme for the wireless network. The UE device selects a fourth transmission scheme when the number of TCI states is two, the number of CDM groups is one, the number of repetitions by which to transmit the data is greater than one, and one of (i) the control information does not indicate the first, second, or third transmission schemes or (ii) the control information does not indicate a transmission scheme.

Implementations of this aspect can include one or more of the following features.

In some implementations, the first transmission scheme can be a frequency division multiplexing (FDM) single transport block (TB) transmission scheme.

In some implementations, the second transmission scheme can be an FDM dual TB transmission scheme.

In some implementations, the third transmission scheme can be an intra-slot repetition TDM transmission scheme.

In some implementations, the fourth transmission scheme can be an inter-slot repetition TDM transmission scheme.

Other implementations are directed to systems, devices and non-transitory, computer-readable mediums comprising instructions for performing the techniques described herein.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF DRAWINGS

A better understanding of the present subject matter can be obtained when the following detailed description of various embodiments is considered in conjunction with the following drawings, in which:

FIGS. 7A-7C illustrate example carrier aggregation techniques for transmitting and/or receiving data over a wireless network.

FIG. 8A-8L illustrate example processes for transmitting and/or receiving data over a wireless network . . . .

Figure 1:
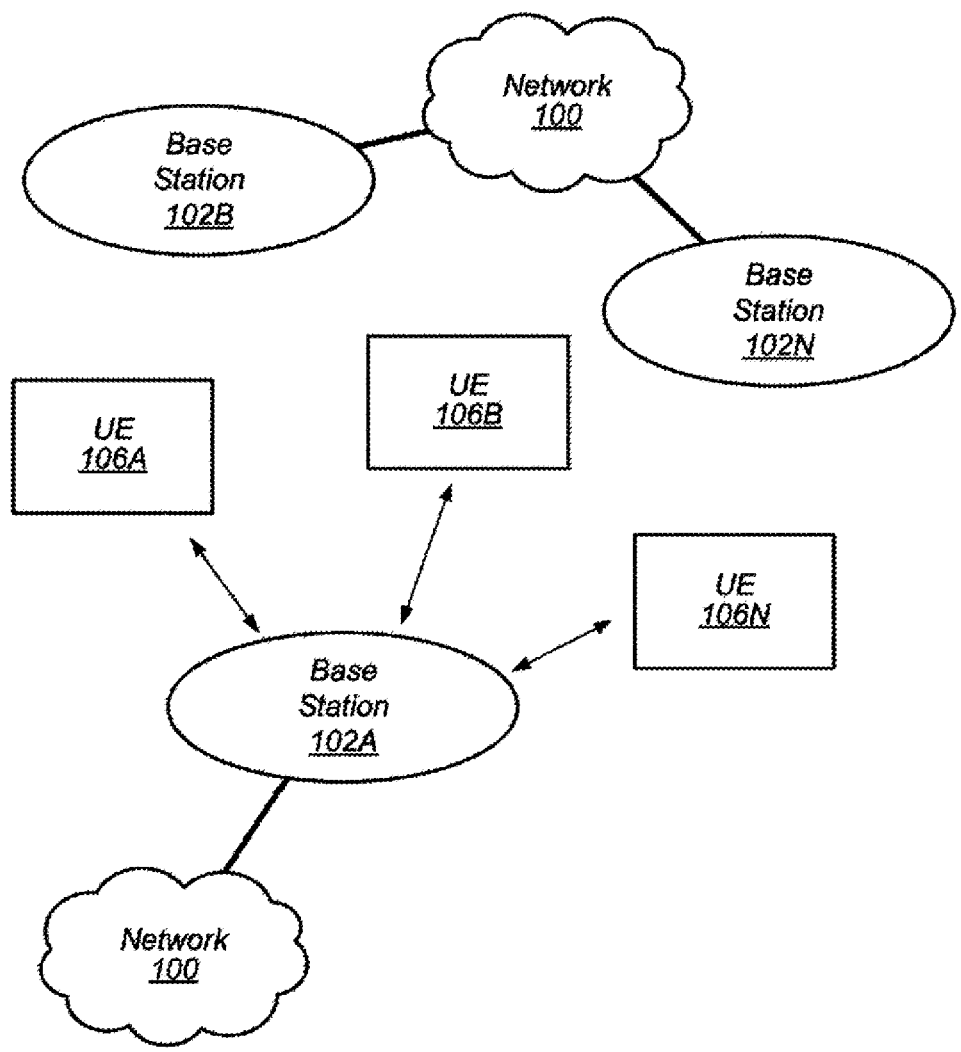
FIG. 1 illustrates an example wireless communication system.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 MHz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Example Communication System

FIG. 1 illustrates a simplified example wireless communication system. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as gNodeB' or gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
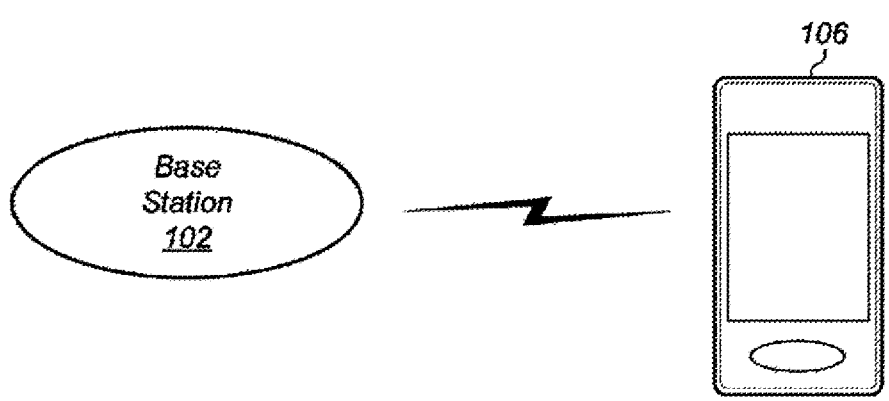
FIG. 2 illustrates a base station (BS) in communication with a user equipment (UE) device.

FIG. 2 illustrates user equipment 106 (e.g., one of the devices 106A through 106N) in communication with a base station 102. The UE 106 may be a device with cellular communication capability such as a mobile phone, a handheld device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Example User Equipment

Figure 3:
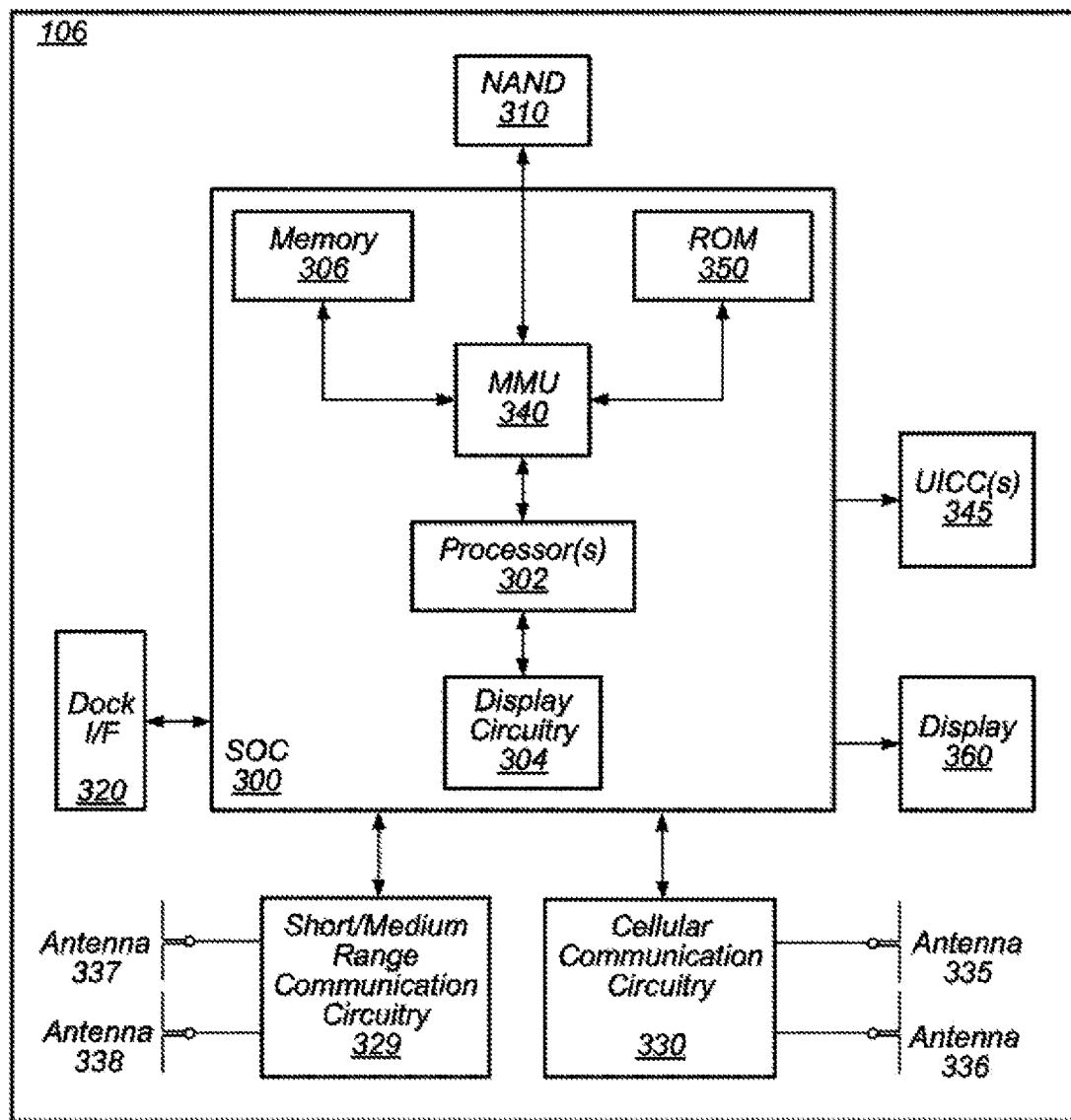
FIG. 3 illustrates an example block diagram of a UE.

FIG. 3 illustrates an example simplified block diagram of a communication device 106. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly; dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity with the first and second network nodes has been established.

The communication device 106 may include hardware and software components for implementing the features described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Example Base Station

Figure 4:
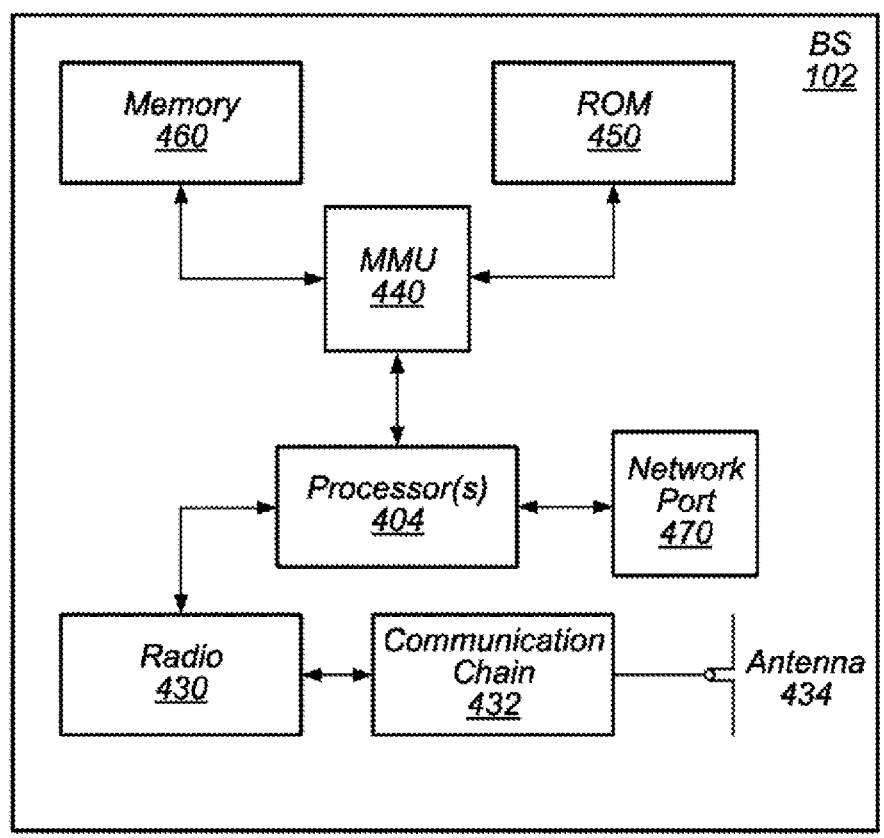
FIG. 4 illustrates an example block diagram of a BS.

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transmission and reception points (TRPs). In addition, a UE capable of operating according to 5G NR may be connected to one or more TRPs within one or more gNB s.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the base station 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the station 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Example Cellular Communication Circuitry

Figure 5:
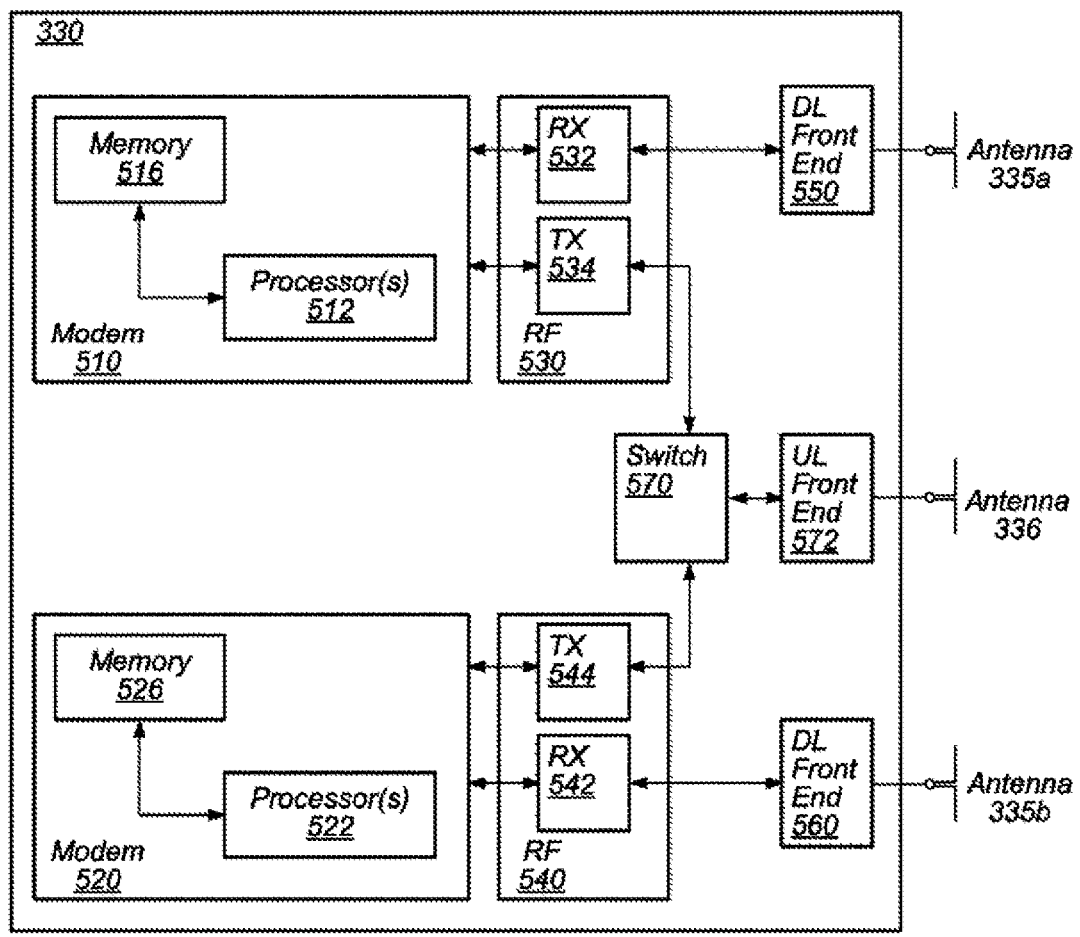
FIG. 5 illustrates an example block diagram of cellular communication circuitry.

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be include in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335 a-b and 336 as shown (in FIG. 3). In some embodiments, cellular communication circuitry 330 may include dedicated receive chains (including and/or coupled to, e.g., communicatively; directly or indirectly; dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335 a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335 b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to establish a first wireless link with a first cell according to a first radio access technology (RAT), wherein the first cell operates in a first system bandwidth and establish a second wireless link with a second cell according to a second radio access technology (RAT), wherein the second cell operates in a second system bandwidth. Further, the cellular communication circuitry 330 may be configured to determine whether the cellular communication circuitry 330 has uplink activity scheduled according to both the first RAT and the second RAT and perform uplink activity for both the first RAT and the second RAT by time division multiplexing (TDM) uplink data for the first RAT and uplink data for the second RAT if uplink activity is scheduled according to both the first RAT and the second RAT. In some embodiments, to perform uplink activity for both the first RAT and the second RAT by time division multiplexing (TDM) uplink data for the first RAT and uplink data for the second RAT if uplink activity is scheduled according to both the first RAT and the second RAT, the cellular communication circuitry 330 may be configured to receive an allocation of a first UL subframe for transmissions according to the first RAT and an allocation of a second UL subframe for transmissions according to the second RAT. In some embodiments, the TDM of the uplink data may be performed at a physical layer of the cellular communication circuitry 330. In some embodiments, the cellular communication circuitry 330 may be further configured to receive an allocation of a portion of each UL subframe for control signaling according to one of the first or second RATs.

The modem 510 may include hardware and software components for implementing the above features described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

The modem 520 may include hardware and software components for implementing the features described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Reporting Multi-Transmission and Receipt Point (Multi-TRP) Compatibility

In some embodiments, a UE device 106 can communicate with one or more base stations 102 according to a multi-transmission and receipt point (multi-TRP) communication protocol. For example, each base station of a wireless network can include one or more TRPs (e.g., one or more antennas or antenna arrays), and a UE device can connect to multiple different TRPs sequentially or concurrently (e.g., in the same base station or in different base stations) to transmit data and/or receive data over the wireless network. This can be beneficial, for example, in enabling the UE device 106 to communicate quickly and reliably to the wireless network under a range of different conditions (e.g., by mitigating the effects of path loss or signal attenuation associated with communicating with each TRP individually).

In some embodiments, a UE device 106 and each of the base stations 102 can coordinate the transmission and/or receipt of data according to a particular schedule. For example, the schedule can specify that data to transmitted between an UE device and particular TRPs of the base stations at specific times and using specific allotments of network resources (e.g., specific frequency domain and/or time domain resource allocation slots). In some embodiments, scheduling information can be exchanged between a UE device and a base station in the form of downlink control information (DCI) messages transmitted over a control channel between the UE device and the base station (e.g., a physical downlink control channel). In some embodiments, a single DCI message can contain scheduling information that enables a UE device to schedule the transmission and/or receipt of data to and from multiple TRPs. This may be referred to as a single DCI multi-TRP communications protocol. In some embodiments, multiple DCI messages can be used to transmit scheduling information that enables a UE device to schedule the transmission and/or receipt of data to and from multiple TRPs. This may be referred to as a multi-DCI multi-TRP communications protocol.

In some embodiments, a device (e.g., a base station 102) can transmit the same data to another device (e.g., a UE device 106) multiple times in repetition. As an example, a device can transmit the same data two, three, four, or more times over a period of time (e.g., according to a periodic schedule). This can be beneficial, for example, in improving the fidelity of the transmission.

In some embodiments, the same data can be transmitted multiple different times, but each instance of the transmitted data can encoded according to different encoding schemes. As an example, a first device can encode a particular portion of data (e.g., a data packet) according to a first encoding scheme, and transmit the encoded data to a second device. Further, the first device can encode the portion of data according to a second encoding scheme, and transmit the differently encoded data to the second device. Accordingly, the same underlying data is transmitted to the second device (e.g., "identical" instances of data are transmitted between the devices). However, the actual signals that are transmitted between the devices may differ, due to the use of different encoding schemes.

In some embodiments, a device can transmit the same data to another UE device multiple times within the same slot (e.g., the same frequency domain and/or time resource allocation slot). This may be referred to as intra-slot repetition or "Scheme 3" according to 5G New Radio (5G NR) standards. Each instance of data (e.g., PDSCH or PUSCH data) can have the same length or time duration in the slot. Further, sequential instances of data can be separated from one another by a particular offset length of time. In some embodiments, the offset length of time can be signaled by a radio resource control (RRC) parameter (e.g., "StartingSymbolOffsetK").

In some embodiments, a device can transmit the same data to another device multiple times within different respective slots (e.g., one instance of the data is included in each of several frequency domain and/or time domain resource allocation slots). This may be referred to as inter-slot repetition or "Scheme 4" according to 5G NR standards. In some embodiments, each instance of the data can be transmitted according to the same time domain resource allocation (TDRA) in each slot (e.g., according to the same start and length indicator value, SLIV). In some embodiments, the number of repetitions can be signaled in the DCI. For example, the number of repetitions can be signaled in the TDRA of a DCI via an "URLLCRepNum" parameter.

Figure 6A:
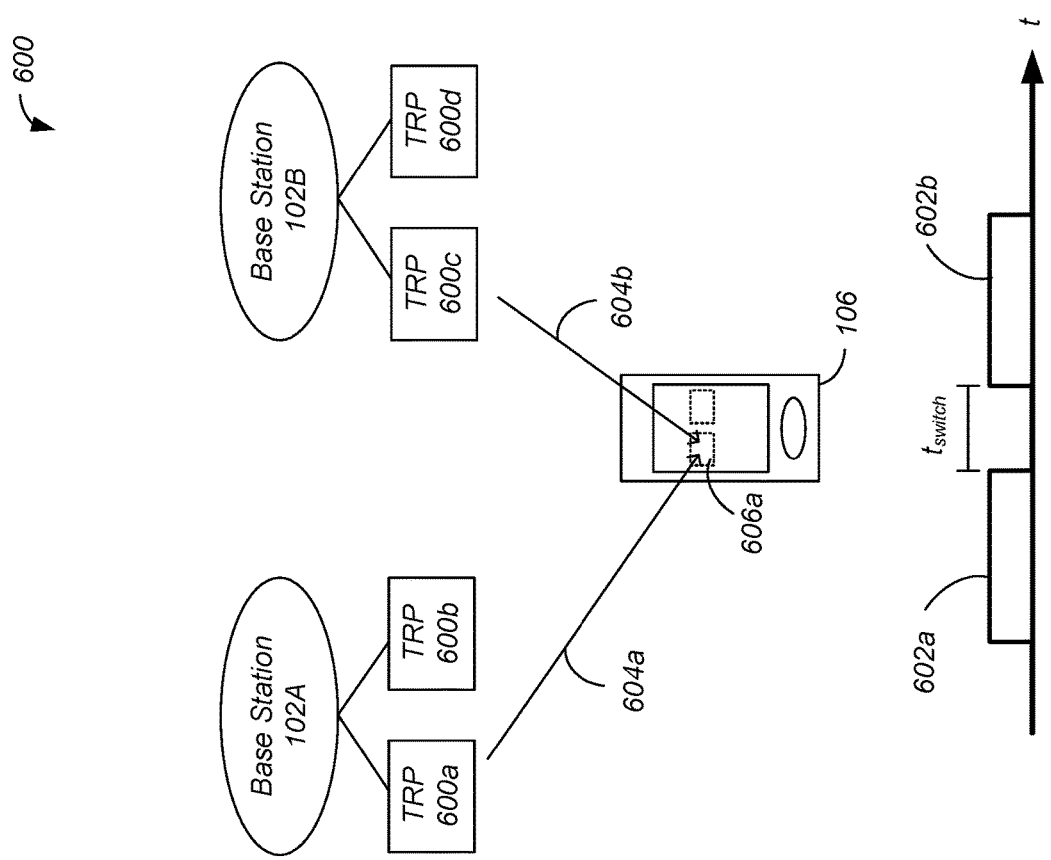
FIGS. 6A and 6B illustrate example systems for transmitting data according to multi-TRP transmission protocol.

An example system 600 for transmitting data according to a multi-TRP transmission protocol is shown in FIG. 6A. The system 600 includes a UE device 106 and two base stations 102A and 102B. The base station 102A includes two TRPs 600a and 600b (e.g., two different antennas or antenna arrays). The base station 102B includes two TRPs 600c and 600d (e.g., two different antennas or antenna arrays). Although FIG. 6A shows two base stations having two TRPs each, this is merely an illustrative example. In practice, there may be any number of base stations, each having any number of TRPs.

In the example shown in FIG. 6A, the base station 102A transmits a first instance of data 602a to the UE device 106 using the TRP 600a. For instance, the base station 102A can form a beam 604a directed towards the UE device 106 using the TRP 600a (e.g., a directional or spatially "shaped" beam formed by patterns of constructive and destructive interference of radio signals emitted by the TRP 600a), and transmit the first instance of data 602a using the beam 604a. The UE device receives the first instance of data 602a by activating a first antenna array 606a, measuring the properties of the beam 604a using the first antenna array 606a, and decoding the first instance of data 602a from the measurements.

Subsequently, the base station 102B transmits a second instance of data 602b to the UE device 106 using the TRP 600c. For instance, the base station 102B can form a beam 604b directed towards the UE device 106 using the TRP 600c (e.g., a directional or spatially "shaped" beam formed by patterns of constructive and destructive interference of radio signals emitted by the TRP 600c), and transmit the second instance of data 602b using the beam 604b. The UE device receives the second instance of data 602b by measuring the properties of the beam 604b using the first antenna array 606a, and decoding the second instance of data 602b from the measurements.

As described above, the first and second instances of data 602a and 602b can be identical (e.g., to improve the fidelity of the data transmission). As an example, the first and the second instance of data 602a and 602b can include the same data (e.g., a data packet) that has been encoded according to the same encoding scheme. As another example, the first and the second instance of data 602a and 602b can include the same data that has been encoded according to different respective encoding schemes (e.g., such that the underlying data are identical, albeit encoded according to different encoding schemes). Further, the scheduling of data transmissions can be specified using DCI messages transmitted between the base stations and the UE device.

As shown in FIG. 6A, the transmission of the first instance of data 602a and the transmission of the second instance of data 602b are offset by a switch delay time $t_{switch}$. The switch delay time $t_{switch}$ can be selected based on the capabilities of the UE device 106 and/or the capabilities of the TRPs with which it communicates. In some embodiments, the switch delay time $t_{switch}$ can be selected based on the amount of time that is needed for the UE device 106 to switch from measuring the properties of one beam (e.g., the beam 604a) to measuring the properties of another beam (e.g., the beam 604b) using the same antenna array (e.g., the antenna array 606a).

Figure 6B:
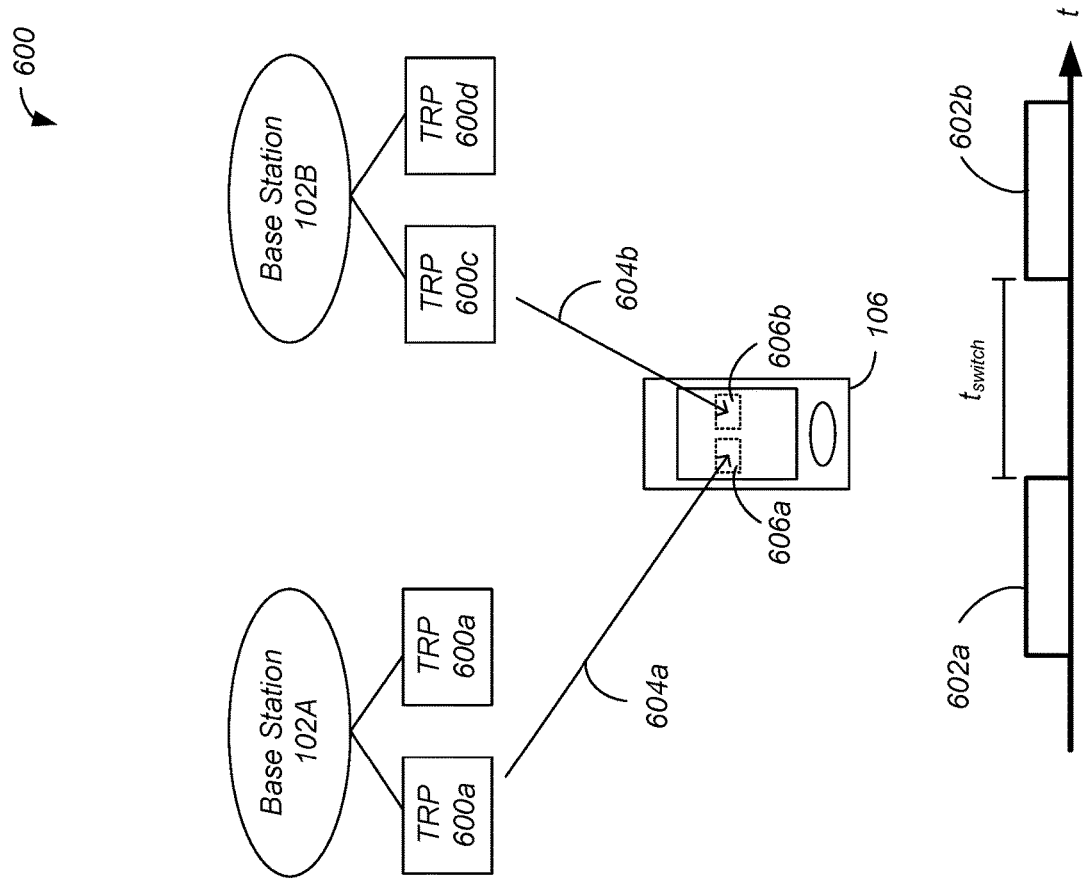

In some embodiments, the switch delay time $t_{switch}$ can be selected based on the amount of time that is needed for the UE device 106 to switch from measuring the properties of one beam using a first antenna array, to measuring the properties of another beam using a second antenna array. For example, referring to FIG. 6B, the base station 102A can transmit a first instance of data 602a to the UE device 106 using the TRP 600a (e.g., by forming a beam 604a directed towards the UE device 106 using the TRP 600a). The UE device can receive the first instance of data 602a by activating a first antenna array 606a, measuring the properties of the beam 604a using the first antenna array 606a, and decoding the first instance of data 602a from the measurements. Subsequently, the base station can 102B transmit a second instance of data 602b to the UE device 106 using the TRP 600c (e.g., by forming a beam 604b directed towards the UE device 106 using the TRP 600c). The UE device can receive the second instance of data 602b by activating a second antenna array 606b, measuring the properties of the beam 604b using the second antenna array 606b, and decoding the second instance of data 602b from the measurements. As shown in FIG. 6B, the switch delay time $t_{switch}$ between transmissions of the instances of data is longer compared to that shown in FIG. 6A, due to the time needed to switch between use of the first antenna array 606a and use of the second antenna array 606b (e.g., to account for additional time to activate the second antenna array 606b and switch to use of the second antenna array 606b).

In some embodiments, the devices of a wireless network may utilize carrier aggregation to increase the rate at which data is transmitted to and/or received from wireless network. For instance, multiple component carriers (e.g., frequency blocks, or ranges of frequencies available for use by devices to transmit data over the wireless network) may be allotted to a particular device to transmit and/or receive data. As the device has a greater frequency range with which to transmit and/or receive data (e.g., compared to the frequency range associated with a single component carrier), the device can transmit and/or receive data over the wireless network according to an increased data rate.

The component carriers allotted to a particular device can be contiguous with respect to the frequency domain, or non-contiguous with respect to the frequency domain. As an example, FIG. 7A shows two component carriers 702a and 702b that are continuous in the same frequency band (Band 1). This may be referred to as intra-band contiguous carrier aggregation. As another example, FIG. 7B shows two component carriers 702c and 702d that are in the same frequency band (Band 1), but are separated by a gap. This may be referred to as intra-band non-contiguous carrier aggregation. As another example, FIG. 7C shows two component carriers 702e and 702f that are in different respective frequency bands (Band 1 and Band 2, respectively). This may be referred to as inter-band carrier aggregation.

In some embodiments, a UE device 106 may require that it be allotted multiple component carriers (e.g., two) to transmit and/or receive data according to a multi-TRP communication protocol. In some embodiments, these component carriers can be grouped together in a single logical group (e.g., identified by a single logical identifier, such as a single component carrier ID), such that it is effectively handled as a single component carrier despite having the network resources of two component carriers. Further, each of the component carriers that have not been aggregated in this manner (e.g., individual component carriers) may also be identified by respective logical group (e.g., a group having a single respective component carrier, and identified by a single respective component carrier ID). Accordingly, in some embodiments, a single logical group could refer to multiple component carriers in combination (e.g., when used in conjunction in a multi-TRP communication protocol), or an individual component carrier, depending on the circumstances.

To ensure that an appropriate amount of network resources are allotted to each device of a wireless network, a device of the wireless network (e.g., a UE device 106) can report to other devices of the wireless network (e.g., base stations 102) whether each logical group supports a multi-TRP communication protocol. If so, those logical groups can be allotted a relatively greater amount of network resources (e.g., as multiple component carriers would be needed). If not, those logical groups can be allotted a relatively lesser amount of network resources (e.g., as only a single component carrier is needed).

In some embodiments, a UE device 106 can separately report whether a particular logical group supports transmitting data according to a multi-TRP communication protocol (e.g., uplink transmissions), and whether the logical group supports receiving data according to a multi-TRP communication protocol (e.g., downlink transmissions). As an example, a UE device 106 can report whether a particular logical group supports transmitting data according to a multi-TRP communication protocol by including an appropriate indication (e.g., data item or parameter) in a data structure that is transmitted to one or base stations when reporting the capabilities of the UE device (e.g., a data structure FeatureSetUplinkPerCC). As another example, a UE device 106 can report whether a particular logical group supports receiving data according to a multi-TRP communication protocol by including an appropriate indication (e.g., data item or parameter) in a data structure that is transmitted to one or base stations when reporting the capabilities of the UE device (e.g., a data structure FeatureSetDownlinkPerCC).

One or more base stations can allot varying amounts of network resources to the UE device based on the information reported by the UE device. For example, if a UE device reports that a particular logical group supports a multi-TRP communication protocol, a base station can allot a first amount of network sources to the UE device with respect to that logical group (e.g., an amount corresponding to the grouping of multiple component carriers in that logical group). For instance, if a multi-TRP communication protocol specifies that two component carriers are to be allotted, the base station can allot two units of network resources to the UE device with respect to the logical group.

As another example, if a UE device reports that a particular logical group does not support a multi-TRP communication protocol, a base station can allot a first amount of network sources to the UE device with respect to that logical group (e.g., an amount corresponding to the grouping of a single component carrier with respect to the logical group). For instance, the base station can allot one unit of network resources to the UE device with respect to the logical group.

In some embodiments, base stations can allot network resources such that no more than a particular maximum amount of resources are allotted to each frequency band (e.g., a maximum number of carrier components for each frequency band available to the UE device to transmit and/or receive data over the wireless network). For example, if a logical group is associated with multiple component carriers (e.g., to enable communication according to multi-TRP communication protocol), a base station may associate a greater resource cost with that logical group. As another example, if a logical group is associated with a single component carrier, a base station may associate a lesser resource cost with that logical group. The base station can assign network resources in a manner that does not exceed the maximum amount of resources can be allocated to each frequency band (e.g., by limiting the number of UE device and/or component carriers that are assigned to each frequency band).

In some embodiments, the resource cost associated with a logical group that supports multi-TRP can be a ratio R times greater than a resource cost associated with logical group associated with a single component carrier. In some embodiments, the ratio R can be two (e.g., if two component carriers are needed to support multi-TRP). In some embodiments, the ratio R can be some other integer value (e.g., 3, 4, 5, or any other integer). In some embodiments, the ratio R can be a non-integer value (e.g., 1.25, 1.5, 1.75, 2.25, or any other non-integer value).

In some embodiments, the devices of a wireless network (e.g., one or more base stations) can allot network resources according to the following equation:

$$N_{cc,0} + R^*N_{cc,1} \leq N_{cc,max} \qquad (\text{Eq. 1})$$

where $N_{cc,0}$ is the number of logical group that do not support multi-TRP for a given frequency band, $N_{cc,1}$ is the number of logical group that support multi-TRP for a given frequency band, and $N_{cc,max}$ is the maximum number of component carriers that a UE device can handle for a given frequency band.

Grouping Control Resource Sets (CORESETs) for Use by UE Devices in a Multi-DCI Multi-TRP Communications Protocol As described herein, in some embodiments, multiple DCI messages can be used to transmit scheduling information that enables a UE device to schedule the transmission and/or receipt of data to and from multiple TRPs. This may be referred to as a multi-DCI multi-TRP communications protocol. In some embodiments, a multi-DCI multi-TRP communications protocol can be implemented by using multiple control resource sets (CORESETs) to carry the scheduling information regarding the transmission and/or receipt of data over the wireless network. For instance, CORESETs can be sets of physical resources (e.g., specific blocks or slots with respect to a frequency domain and time domain) and sets of parameters that are used to carry DCI messages that specify the scheduling of data transmission and/or receipt over the wireless network. In some embodiments, each CORESET can be used to establish a communication link between the UE device and a single respective TRP.

In some embodiments, a communication protocol may specify that a particular maximum number of CORESETs can be allocated within each component carrier. As an example, in at least some multi-DCI multi-TRP communications protocols, a maximum of five CORESETs can be allocated within a particular bandwidth part (BWP) (e.g., a contiguous or non-continuous set of physical resource blocks of a given component carrier). Further, a maximum of four BWPs can be allocated within each component carrier. Accordingly, a maximum of 20 CORESETs can be allocated within each component carrier.

Further, the devices of a wireless network can be configured to handle a particular number of CORESETs. As an example, in at least some multi-DCI multi-TRP communications protocols, a UE device can be configured to handle a maximum number of 16 CORESETs.

Although example numbers of CORESETs and BWPs are described above, these are merely illustrative examples. In practice, other combinations of CORESETs, BWPs, and component carriers are also possible. Further, in practice, a UE device can be configured to handle any other number of CORESETs. d In the example described above, the maximum number of CORESETs that can be allocated within a particular component carrier (e.g., 20 CORESETs) is greater than the maximum number of CORESETs that can be handled by a UE device (e.g., 16 CORESETs). Accordingly, the UE device must configure at least one of its 16 CORESETs such that it is used when communicating with any one of multiple different TRPs.

In some embodiments, a wireless network (e.g., one or more base stations) can generate one or more logical groups (e.g., indicated by a logical identifier, such as a CORESET Pool ID), with each logical group corresponding to a different TRP with which the UE device can communicate. Further, a UE device can associate one or more CORESETs with each logical group.

As an example, a network can generate a logical group CORESET Pool ID 1, corresponding to a first TRP. Further, the UE device can associate a first CORESET (CORESET 1) with the logical group CORESET Pool ID 1 (e.g., signifying that the CORESET 1 be used when communicating with the first TRP). Further, the network can generate a logical group CORESET Pool ID 2, corresponding to a second TRP. Further, the UE device can associate the CORESET 1 with the logical group CORESET Pool ID 2 (e.g., signifying that the CORESET 1 also be used when communicating with the second TRP). In this manner, a UE device can configure a single CORESET such that is used when communicating with any one of multiple different TRPs.

When allocating network resources, the devices of a wireless network can associate a network resource cost associated with each CORESET. For instance, if a particular CORESET is associated with a single logical group (e.g., indicating that is to be used when communicating with a single TRP), the CORESET can be associated with a first network resource cost (e.g., one unit of network resources). However, if a particular CORESET is associated with two different logical groups (e.g., indicating that is to be used when communicating with any one of two different TRPs), the CORESET can be associated with a second network resource cost (e.g., two units of network resources). In some embodiments, the network resource cost associated with each CORESET can be proportional to the number of logical groups with which the CORESET is associated.

As discussed above, in some embodiments, communications protocol may specify that a particular maximum number of CORESETs can be allocated within each BWP and/or component carrier. For example, in at least some multi-DCI multi-TRP communications protocols, a maximum of five CORESETs can be allocated within a particular BWP. Further, a maximum of four BWPs can be allocated within each component carrier. Accordingly, a maximum of 20 CORESETs can be allocated within each component carrier.

In some embodiments, each CORESET can be "counted" once against this limitation for each logical group with which it is associated. For example, if each CORESET is associated with one respective logical group, then a maximum of five of these CORESETs can be allocated within a particular BWP, and a maximum of 20 of these CORESETs can be allocated within each component carrier.

As another example, if one of the CORESETs is associated with two respective logical groups, then that CORESET is "counted" twice against this limitation. Accordingly, with respect to the limitation above, that CORESET can be allocated within a particular BWP, along with three CORESETS that are associated with a single respective logical group.

In some embodiments, a network can configure each logical group individually. For example, a network can generate one or more logical groups. Further, for each logical group, the network can enumerate each of the CORESETs that are associated with that logical group. In some embodiments, each of the CORESETs can be enumerated using a ControlResourceSetId parameter. A UE device can store each a record of the logical groups and their respective enumerated CORESETs (e.g., in a storage device of the UE device), and transmit data to and/or receive data from the wireless data consistent with that record.

In some embodiments, logical groups within a single BWP can include one or more CORESETs that are common to each of the logical groups. For example, a BWP may include a logical group CORESET Pool ID 1 and a logical group CORESET Pool ID 2. A CORESET 1 may be associated with both the CORESET Pool ID 1 and the CORESET Pool ID 2 (e.g., the CORESET 1 overlaps across the logical groups).

In some embodiments, logical groups within a single BWP do not have any CORESETs that are common to each of the logical groups. For example, a BWP may include a logical group CORESET Pool ID 1 and a logical group CORESET Pool ID 2. The one or more CORESETs associated with the CORESET Pool ID 1 and the one or more CORESETs associated with the CORESET Pool ID 2 can be mutually exclusive to one another (e.g., none of the CORESETs overlap across the logical groups).

Dynamic Single DCI Operation

In some embodiments, devices can be transmitted over a wireless network using dynamic point section (DPS) communication protocol. According to a DPS communication protocol, a transmitting device identifies multiple available TRPs to which it can send data to a receiving device. The transmitting device selects one of the TRPs based on one or more quality metrics (e.g., signal strength, path loss, latency, etc.) and transmits the data to the receiving device through the selected TRP. Further, the transmitting device can dynamically select different TRPs over time, depending on changes to the one or more quality metrics.

In some embodiments, a DPS communication protocol can be used in conjunction with intra-slot, inter-slot repetition, or no data repetition. As an example, a UE device can obtain control information regarding how data is to be transmitted over the wireless network. The UE device can selectively use a DPS communication protocol with intra-slot repetition, inter-slot repetition, or no data repetition when the control information indicates that certain criteria have been met.

Example 1: As a first example, a UE device can obtain control information (e.g., from a base station) regarding a transmission scheme a wireless network. The control information can include an indication of a number of transmission configuration indication (TCI) states associated with the transmission, an indication of a number of code division multiplexing (CDM) groups associated with the transmission, and an indication of a number of repetitions by which to transmit the data. The UE device can select a transmission scheme for transmitting the data to the wireless network based on the control information.

For instance, the UE device can select an inter-slot repetition TDM transmission scheme when (i) the number of TCI states is one, and (ii) the number of repetitions by which to transmit the data is greater than one. The UE device can also select the inter-slot repetition TDM transmission scheme when (i) the number of TCI states is one, (ii) the number of repetitions by which to transmit the data is greater than one, and (iii) and the number of CDM groups is one. In some embodiments, the inter-slot repetition TDM transmission scheme can be performed with respect to less than or equal to two port transmission ports.

Otherwise (e.g., if the inter-slot repetition TDM transmission scheme is not selected), the UE device can select a transmission scheme with data repetition (e.g., a transmission scheme without data repetition specified by Revision 15 of the 5G NR standards).

After selecting an appropriate transmission scheme, the UE device transmits the data to the network using the selected transmission scheme.

Example 2: As a second example, a UE device can obtain control information (e.g., from a base station) regarding a transmission scheme a wireless network. The control information can include an indication of a number of TCI states associated with the transmission. The UE device can select a transmission scheme for transmitting the data to the wireless network based on the control information.

For instance, the UE device can select an inter-slot repetition TDM transmission scheme when (i) the number of TCI states is one, (ii) a number of repetitions by which to transmit the data is greater than one, (iii) and the control information does not include an indication of a transmission scheme to be used for the transmission (e.g., a parameter URLLCSchemeEnabler is not configured).

Further, the UE device can select an intra-slot repetition TDM transmission scheme when (i) the number of TCI states is one, (ii) the control information does not indicate the number of repetitions by which to transmit the data, and (iii) the control information includes an indication that a "Mode 3" transmission scheme be used for the transmission. The Mode 3 transmission scheme is an intra-slot repetition time division multiplexing (TDM) transmission scheme. In some embodiments, it may be referred to as "TDMSchemeA."

Further, the UE device can select one an inter-slot repetition TDM transmission scheme, an intra-slot repetition TDM transmission scheme, or a transmission scheme without data repetition when (i) when the number of TCI states is one, (ii) the control information indicates that the number of repetitions by which to transmit the data is greater than one, and (iii) the control information indicates that the "Mode 3" transmission scheme be used for the transmission.

Otherwise, the UE device can select a transmission scheme with data repetition (e.g., a transmission scheme without data repetition specified by Revision 15 of the 5G NR standards).

After selecting an appropriate transmission scheme, the UE device transmits the data to the network or receives data from the network using the selected transmission scheme.

Example 3: As a third example, a UE device can obtain control information (e.g., from a base station) regarding a transmission scheme a wireless network. The control information includes an indication of a number of TCI states associated with the transmission, and an indication of a number of CDM groups associated with the transmissions. The UE select a non-coherent joint transmission (NCJT) transmission scheme responsive to determining that (i) the number of TCI states is two, and (ii) the number of CDM groups is two. According to the NCJT transmission scheme, two physical downlink shared channels (PDSCHs) that are transmitted through the wireless network are permitted to at least partially overlap in at least one of a frequency domain or a time domain. For example, the PDSCHs can fully overlap, partially overlap, or not overlap at all.

Example 4: As a fourth example, a UE device can obtain control information (e.g., from a base station) regarding a transmission scheme a wireless network. The control information can include an indication of a number of TCI states associated with the transmission, an indication of a number of CDM groups associated with the transmissions, and an indication of a number of repetitions of the transmitted data. The UE device can select a transmission scheme for receiving the data from the wireless network based on the control information.

For instance, the UE device can select an inter-slot repetition TDM transmission scheme when (i) the number of TCI states is two, (ii) the number of CDM groups is one, and (iii) the number of repetitions of the transmitted data is greater than one.

Further, the UE device can select from among a group of candidate transmission schemes when (i) the number of TCI states is two, (ii) the number of CDM groups is one, and (iii) the number of repetitions of the transmitted data is not greater than one. The candidate transmission schemes can include an a frequency division multiplexing (FDM) single transport block (TB) transmission scheme, a FDM dual TB transmission scheme, and an intra-slot repetition TDM transmission scheme.

After selecting an appropriate transmission scheme, the UE device receives the data from the network using the selected transmission scheme.

Example 5: As a fifth example, a UE device can obtain control information (e.g., from a base station) regarding a transmission scheme a wireless network. The control information can include an indication of a number of TCI states associated with the transmission, an indication of a number of CDM groups associated with the transmissions, an indication of a number of repetitions of the transmitted data, and an indication of the transmission scheme of the wireless network. The UE device can select a transmission scheme for receiving the data from the wireless network based on the control information.

For instance, the UE device can select a frequency division multiplexing (FDM) single transport block (TB) transmission scheme when (i) the number of TCI states is two, (ii) the number of CDM groups is one, and (iii) the control information indicates a FDM TB transmission scheme for the wireless network.

Further, the UE device can select a FDM dual TB transmission scheme when (i) the number of TCI states is two, (ii) the number of CDM groups is one, and (iii) the control information indicates a FDM dual TB transmission scheme for the wireless network.

Further, the UE device can select an intra-slot repetition TDM transmission scheme when (i) the number of TCI states is two, (ii) the number of CDM groups is one, and (iii) the control information indicates an intra-slot repetition TDM transmission scheme for the wireless network.

Further, the UE device can select an inter-slot repetition TDM transmission scheme when (i) the number of TCI states is two, (ii) the number of CDM groups is one, (iii) the number of repetitions by which to transmit the data is greater than one, and (iii, a) the control information does not indicate any of the above transmission schemes in this example or (iii, b) the control information does not indicate a transmission scheme at all.

After selecting an appropriate transmission scheme, the UE device transmits the data to the network using the selected transmission scheme.

Example Processes

FIG. 8A shows an example process 800 for transmitting and/or receiving data over a wireless network. The process 800 can be performed by one or more of the devices described herein. As an example, the process 800 can be performed by a UE device 160 to transmit data to and/or receive data from a base station 102.

According to the process 800, a UE device determines one or more component carriers available to the UE device for at least one of transmitting or receiving data over a wireless network (step 802).

The UE device transmits, to the wireless network, for each component carrier, an indication whether the component carrier supports at least one of transmitting or receiving data according to a multi-transmission and receiving points (multi-TRP) communication protocol (step 804).

In some embodiments, for each component carrier, the indication whether the component carrier supports at least one of transmitting or receiving data according to the multi-TRP communication protocol can include (i) a first data item indicating whether the component carrier supports transmitting data according to the multi-TRP communication protocol, and (ii) a second data item indicating whether the component carrier supports receiving data according to the multi-TRP communication protocol.

In some embodiments, according to the multi-TRP communication protocol, the UE device can be configured to transmit a first instance of data to a first TRP of the wireless network, and transmit a second instance of data to a second TRP of the wireless network.

In some embodiments, according to the multi-TRP communication protocol, the UE device can be configured to receive a first instance of data from a first TRP of the wireless network, and receive a second instance of data from a second TRP of the wireless network.

In some embodiments, the process 800 can further include receiving, by a base station of the wireless network, for each component carrier, the indication whether the component carrier supports at least one of transmitting or receiving data according to the multi-TRP communication protocol; determining, by the base station, that a first component carrier of the one or more component carriers supports at least one of transmitting or receiving data according to the multi-TRP communication protocol; and responsive to determining that the first component carrier supports at least one of transmitting or receiving data according to the multi-TRP communication protocol, allotting a first resource cost to the first component carrier.

In some embodiments, the process 800 can further include determining, by the base station, that a second component carrier of the one or more component carriers does not support at least one of transmitting or receiving data according to the multi-TRP communication protocol; and responsive to determining that the second component carrier does not support at least one of transmitting or receiving data according to the multi-TRP communication protocol, allotting a second resource cost to the second component carrier, the first resource cost being greater than the second resource cost.

In some embodiments, the each of the first resource cost and the second resource cost correspond to a number of component carriers that the UE device can support during carrier aggregation.

In some embodiments, for each component carrier, the indication whether the component carrier supports at least one of transmitting or receiving data according to the multi-TRP can include a data item indicating a resource cost associated with transmitting data using the control channel according to the multi-TRP communication protocol.

In some embodiments, the resource cost can be an integer value. In some embodiments, the resource cost can be a non-integer value.

FIG. 8B shows an example process 810 for transmitting and/or receiving data over a wireless network. The process 810 can be performed by one or more of the devices described herein. As an example, the process 810 can be performed by a base station 102 to transmit data to and/or receive data from a UE device 160.

According to the process 810, a base station of a wireless network determines a plurality of control resource sets (CORESETs) available to transmit and receive points (TRPs) of the wireless network for at least one of transmitting or receiving data over the wireless network (step 812).

The base station generates resource allocation assignments for the TRPs of the wireless network (step 814). Generating the resource allocation assignments includes, for each of the CORESETs, associating the CORESET with one or more respective logical identifiers. Each logical identifier corresponds to a different respective TRP of the wireless network. At least one of the CORESETs is associated with two respective logical identifiers.

In some embodiments, generating the resource allocation assignments can include, for each the logical identifiers, enumerating each of the CORESETs associated with that logical identifier. The plurality of CORESETs can be distributed among a plurality of different groups with respect to the frequency domain and the time domain (e.g., bandwidth parts). A first logical identifier can be associated with a first subset of CORESETs, where the first subset of CORESETs are associated with a first group with respect to the frequency domain and the time domain (e.g., a first bandwidth part). A second logical identifier can be associated with a second subset of CORESETs, where the second subset of CORESETs are associated with the first group with respect to the frequency domain and the time domain (e.g., the first bandwidth part). The first subset of CORESETs and the second subset of CORESETs can be non-mutually exclusive.

In some embodiments, the plurality of CORESETs can be distributed among a plurality of different groups with respect to the frequency domain and the time domain (e.g., bandwidth parts). A first logical identifier can be associated with a first subset of CORESETs, where the first subset of CORESETs are associated with a first group with respect to the frequency domain and the time domain (e.g., a first bandwidth part). A second logical identifier can be associated with a second subset of CORESETs, where the second subset of CORESETs are associated with the first group with respect to the frequency domain and the time domain (e.g., the first bandwidth part). The first subset of CORESETs and the second subset of CORESETs can be mutually exclusive.

The base station allocates network resources to the TRPs of the wireless network according to the resource allocation assignments (step 816).

In some embodiments, allocating network resources to the TRPs of the wireless network can include determining that a first CORESET is associated with a single logical identifier, and allocating a first amount of network resources with respect to the first CORESET.

In some embodiments, allocating network resources to the base stations of the wireless network can include determining that a second CORESET is associated with multiple logical identifiers, and allocating a second amount of network resources with respect to the second CORESET. The second amount of network resources can be greater than the first amount of network resources.

In some embodiments, a first CORESET can be common to the first subset of CORESETs and the second subset of CORESETs. Further, a second CORESET can be included in one of the first subset of CORESETs or the second subset of CORESETs. Further, the process 810 can further include allocating a first amount of network resources with respect to the first CORESET, and allocating a second amount of network resources with respect to the second CORESET. The first amount of network resources can be greater than the second amount of network resources.

FIG. 8C shows an example process 820 for transmitting and/or receiving data over a wireless network. The process 820 can be performed by one or more of the devices described herein. As an example, the process 820 can be performed by a UE device 160 to transmit data to and/or receive data from a base station 102.

According to the process 820, a UE device receives control information regarding a transmission scheme of a wireless network (step 822). The control information includes at least an indication of a number of transmission configuration indication (TCI) states associated with the transmission, an indication of a number of code division multiplexing (CDM) groups associated with the transmission, and an indication of a number of repetitions by which to transmit the data.

The UE device selects a transmission scheme for transmitting the data to the wireless network (step 824).

Selecting the transmission scheme includes selecting a first transmission scheme when the number of TCI states is one and at least one of a first set of criteria or a second set of criteria are satisfied. The first set of criteria is satisfied when the number of repetitions by which to transmit the data is greater than one. The second set of criteria is satisfied when the number of repetitions by which to transmit the data is greater than one and the number of CDM groups is one.

In some embodiments, the first transmission scheme can be an inter-slot repetition time division multiplexing (TDM) transmission scheme. In some embodiments, the first transmission scheme can be an inter-slot repetition TDM transmission scheme performed with respect to less than or equal to two transmission ports.

Selecting the transmission scheme also includes selecting a second transmission scheme when the number of TCI states is one and neither the first set of criteria nor the second set of criteria are satisfied.

In some embodiments, the second transmission scheme can be a transmission scheme without data repetition (e.g., as specified by Revision 15 of the 5G NR standards).

The UE device transmits the data to the wireless network according to the selected transmission scheme (step 826).

FIG. 8D shows an example process 830 for transmitting and/or receiving data over a wireless network. The process 830 can be performed by one or more of the devices described herein. As an example, the process 830 can be performed by a base station 102 to transmit data to and/or receive data from a UE device 160.

According to the process 830, a base station transmits, to a UE device, control information regarding a transmission scheme of a wireless network (step 832). The control information includes at least an indication of a number of transmission configuration indication (TCI) states associated with the transmission, an indication of a number of code division multiplexing (CDM) groups associated with the transmission, and an indication of a number of repetitions by which to transmit the data.

The base station receives, from the UE device over the wireless network, data according to a transmission scheme selected by the UE device (step 834). A first transmission scheme is selected based on a determination by the UE device that the number of TCI states is one and at least one of a first set of criteria or a second set of criteria are satisfied. A second transmission scheme is selected based on a determination that the number of TCI states is one and neither the first set of criteria nor the second set of criteria are satisfied.

The first set of criteria is satisfied when the number of repetitions by which to transmit the data is greater than one. The second set of criteria is satisfied when the number of repetitions by which to transmit the data is greater than one and the number of CDM groups is one.

In some embodiments, the first transmission scheme can be an inter-slot repetition time division multiplexing (TDM) transmission scheme. In some embodiments, the first transmission scheme can be an inter-slot repetition TDM transmission scheme performed with respect to less than or equal to two transmission ports.

In some embodiments, the second transmission scheme can be a transmission scheme without data repetition (e.g., a transmission scheme without data repetition specified by Revision 15 of the 5G NR standards).

Figure 8E:
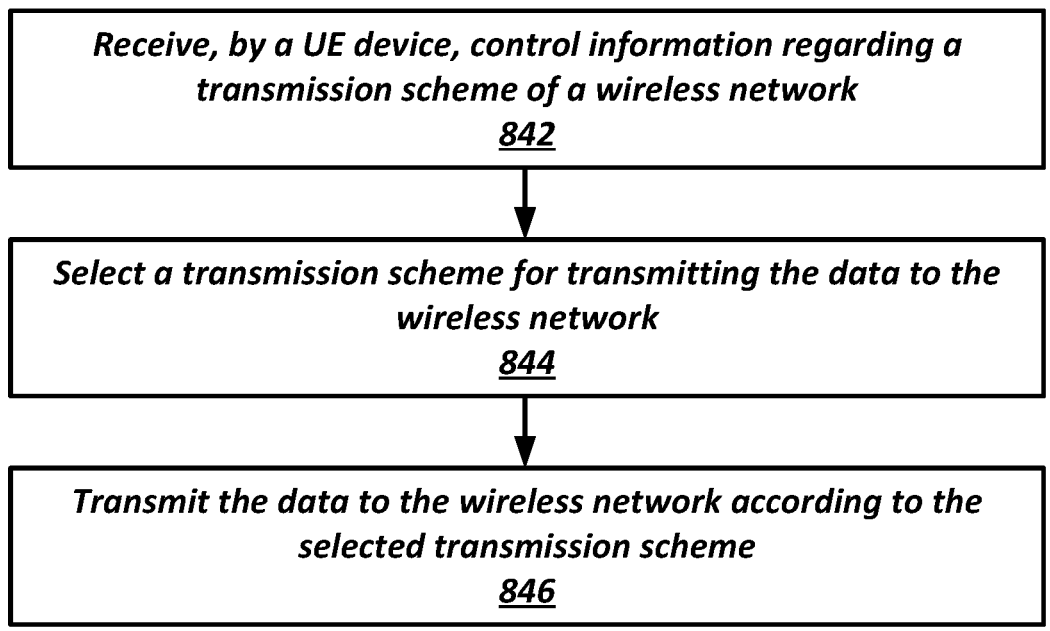

FIG. 8E shows an example process 840 for transmitting and/or receiving data over a wireless network. The process 840 can be performed by one or more of the devices described herein. As an example, the process 840 can be performed by a UE device 160 to transmit data to and/or receive data from a base station 102.

According to the process 840, a UE device receives control information regarding a transmission scheme of a wireless network (step 842). The control information includes at least an indication of a number of transmission configuration indication (TCI) states associated with the transmission.

The UE device selects a transmission scheme for transmitting the data to the wireless network (step 844).

The UE device selects a first transmission scheme when the number of TCI states is one and a first set of criteria are satisfied. The first set of criteria is satisfied when the control information indicates that a number of repetitions by which to transmit the data is greater than one and the control information does not include an indication of a transmission scheme to be used for the transmission. In some embodiments, the first transmission scheme can be an inter-slot repetition time division multiplexing (TDM) transmission scheme.

The UE device selects a second transmission scheme when the number of TCI states is one and a second set of criteria are satisfied. The second set of criteria is satisfied when the control information does not indicate the number of repetitions by which to transmit the data and the control information includes an indication that an intra-slot repetition time division multiplexing (TMD) transmission scheme be used for the transmission. In some embodiments, the second transmission scheme can be the intra-slot repetition TDM transmission scheme.

The UE device selects a third transmission scheme when the number of TCI states is one and a third set of criteria are satisfied. The third set of criteria is satisfied when the control information indicates that the number of repetitions by which to transmit the data is greater than one and the control information indicates that the intra-slot TDM transmission scheme be used for the transmission. In some embodiments, the third transmission scheme can be one of the inter-slot repetition TDM transmission scheme, the intra-slot repetition TDM transmission scheme, or a transmission scheme without data repetition.

The UE device selects a fourth transmission scheme when the number of TCI states is one and neither the first set of criteria, the second set of criteria, nor the third set of criteria are satisfied. In some embodiments, the fourth transmission scheme can be a transmission scheme without data repetition (e.g., a transmission scheme without data repetition specified by Revision 15 of the 5G NR standards).

The UE device transmits the data to the wireless network according to the selected transmission scheme (step 846).

FIG. 8F shows an example process 850 for transmitting and/or receiving data over a wireless network. The process 850 can be performed by one or more of the devices described herein. As an example, the process 850 can be performed by a base station 102 to transmit data to and/or receive data from a UE device 160.

According to the process 850, a base station transmits, to a UE device, control information regarding a transmission scheme of a wireless network (step 852). The control information includes at least an indication of a number of transmission configuration indication (TCI) states associated with the transmission.

The base station receives, from the UE device over the wireless network, data according to a transmission scheme selected by the UE device (step 854).

The UE device selects a first transmission scheme when the number of TCI states is one and a first set of criteria are satisfied. The first set of criteria is satisfied when the control information indicates that a number of repetitions by which to transmit the data is greater than one and the control information does not include an indication of a transmission scheme to be used for the transmission. In some embodiments, the first transmission scheme can be an inter-slot repetition time division multiplexing (TDM) transmission scheme.

The UE device selects a second transmission scheme when the number of TCI states is one and a second set of criteria are satisfied. The second set of criteria is satisfied when the control information does not indicate the number of repetitions by which to transmit the data and the control information includes an indication that an intra-slot repetition time division multiplexing (TMD) transmission scheme be used for the transmission. In some embodiments, the second transmission scheme can be the intra-slot repetition TDM transmission scheme.

The UE device selects a third transmission scheme when the number of TCI states is one and a third set of criteria are satisfied. The third set of criteria is satisfied when the control information indicates that the number of repetitions by which to transmit the data is greater than one and the control information indicates that the intra-slot TDM transmission scheme be used for the transmission. In some embodiments, the third transmission scheme can be one of the inter-slot repetition TDM transmission scheme, the intra-slot repetition TDM transmission scheme, or a transmission scheme without data repetition.

The UE device selects a fourth transmission scheme when the number of TCI states is one and neither the first set of criteria, the second set of criteria, nor the third set of criteria are satisfied. In some embodiments, the fourth transmission scheme can be a transmission scheme without data repetition (e.g., a transmission scheme without data repetition specified by Revision 15 of the 5G NR standards).

Figure 8G:
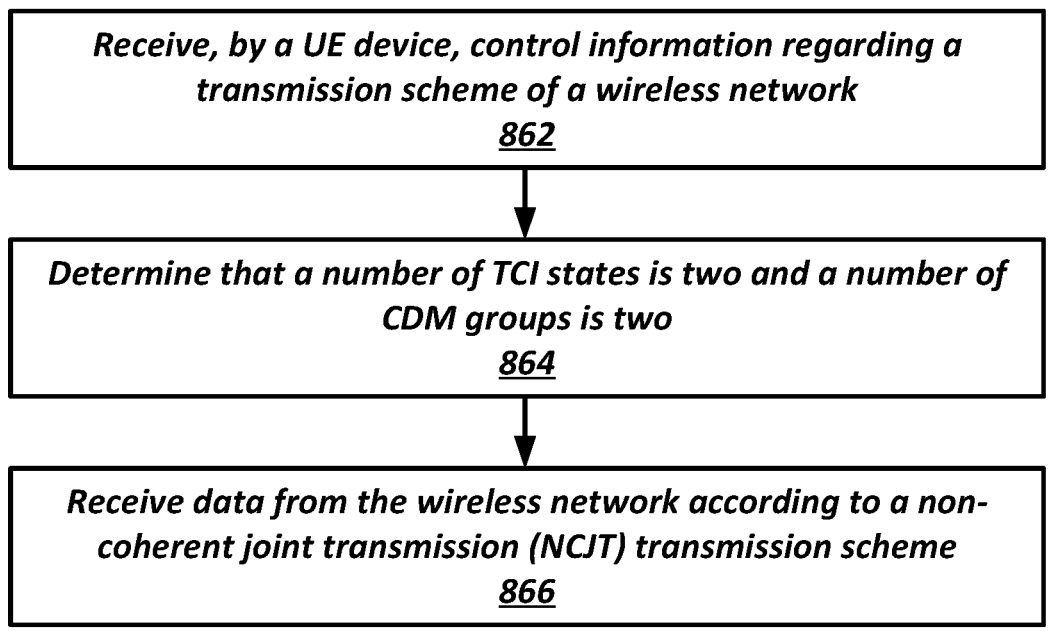

FIG. 8G shows an example process 860 for transmitting and/or receiving data over a wireless network. The process 860 can be performed by one or more of the devices described herein. As an example, the process 860 can be performed by a UE device 160 to transmit data to and/or receive data from a base station 102.

According to the process 860, a UE device receives control information regarding a transmission scheme of a wireless network (step 862). The control information includes at least an indication of a number of transmission configuration indication (TCI) states associated with the transmission, and an indication of a number of code division multiplexing (CDM) groups associated with the transmissions.

The UE device determines that the number of TCI states is two and the number of CDM groups is two (step 864). In response, the UE device receives the data from the wireless network according to a non-coherent joint transmission (NCJT) transmission scheme (step 866). In some embodiments, according to the NCJT transmission scheme, two physical downlink shared channels (PDSCHs) transmitted through the wireless network can be permitted to at least partially overlap in at least one of a frequency domain or a time domain.

FIG. 8H shows an example process 870 for transmitting and/or receiving data over a wireless network. The process 870 can be performed by one or more of the devices described herein. As an example, the process 870 can be performed by a base station 102 to transmit data to and/or receive data from a UE device 160.

According to the process 870, a base station transmits, to a UE device, control information regarding a transmission scheme of a wireless network (step 872). The control information includes at least an indication of a number of transmission configuration indication (TCI) states associated with the transmission, and an indication of a number of code division multiplexing (CDM) groups associated with the transmissions.

The base station transmits, to the UE device over the wireless network, data according to a transmission scheme selected by the UE device (step 874). The UE device selects a non-coherent joint transmission (NCJT) transmission scheme upon determining that the number of TCI states is two and the number of CDM groups is two.

In some embodiments, according to the NCJT transmission scheme, two physical downlink shared channels (PD- SCHs) transmitted through the wireless network can be permitted to at least partially overlap in at least one of a frequency domain or a time domain.

Figure 8I:
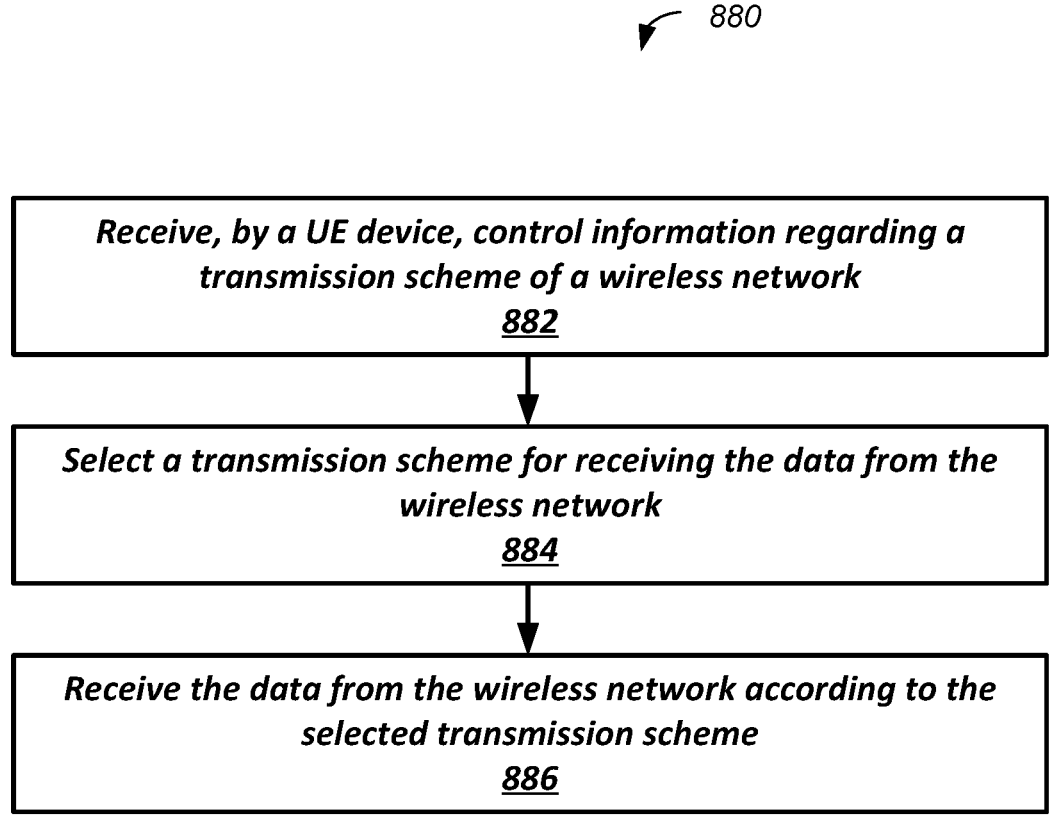

FIG. 8I shows an example process 880 for transmitting and/or receiving data over a wireless network. The process 880 can be performed by one or more of the devices described herein. As an example, the process 880 can be performed by a UE device 160 to transmit data to and/or receive data from a base station 102.

According to the process 880, a UE device receives control information regarding a transmission scheme of a wireless network (step 882). The control information includes at least an indication of a number of transmission configuration indication (TCI) states associated with the transmission, an indication of a number of code division multiplexing (CDM) groups associated with the transmissions, and an indication of a number of repetitions of the transmitted data.

The UE device selects a transmission scheme for receiving the data from the wireless network, (step 884).

The UE device selects a first transmission scheme when the number of TCI states is two, the number of CDM groups is one, and the number of repetitions of the transmitted data is greater than one. In some embodiments, the first transmission scheme is an inter-slot repetition time division multiplexing (TDM) transmission scheme.

The UE device selects a second transmission scheme from among a plurality of candidate transmission schemes when the number of TCI states is two, the number of CDM groups is one, and the number of repetitions of the transmitted data is not greater than one. In some embodiments, the plurality of candidate transmission schemes include an a frequency division multiplexing (FDM) single transport block (TB) transmission scheme, a FDM dual TB transmission scheme, and an intra-slot repetition TDM transmission scheme.

The UE device receives the data from the wireless network according to the selected transmission scheme (step 886).

FIG. 8J shows an example process 890 for transmitting and/or receiving data over a wireless network. The process 890 can be performed by one or more of the devices described herein. As an example, the process 890 can be performed by a base station 102 to transmit data to and/or receive data from a UE device 160.

According to the process 890, a base station transmits, to a UE device, control information regarding a transmission scheme of a wireless network (step 892). The control information includes at least an indication of a number of transmission configuration indication (TCI) states associated with the transmission, an indication of a number of code division multiplexing (CDM) groups associated with the transmissions, and an indication of a number of repetitions of the transmitted data.

The base station transmits, to the UE device over the wireless network, data according to a transmission scheme selected by the UE device (step 894).

The UE device selects a first transmission scheme when the number of TCI states is two, the number of CDM groups is one, and the number of repetitions of the transmitted data is greater than one. In some embodiments, the first transmission scheme is an inter-slot repetition time division multiplexing (TDM) transmission scheme.

The UE device selects a second transmission scheme from among a plurality of candidate transmission schemes when the number of TCI states is two, the number of CDM groups is one, and the number of repetitions of the transmitted data is not greater than one. In some embodiments, the plurality of candidate transmission schemes include an a frequency division multiplexing (FDM) single transport block (TB) transmission scheme, a FDM dual TB transmission scheme, and an intra-slot repetition TDM transmission scheme.

Figure 8K:
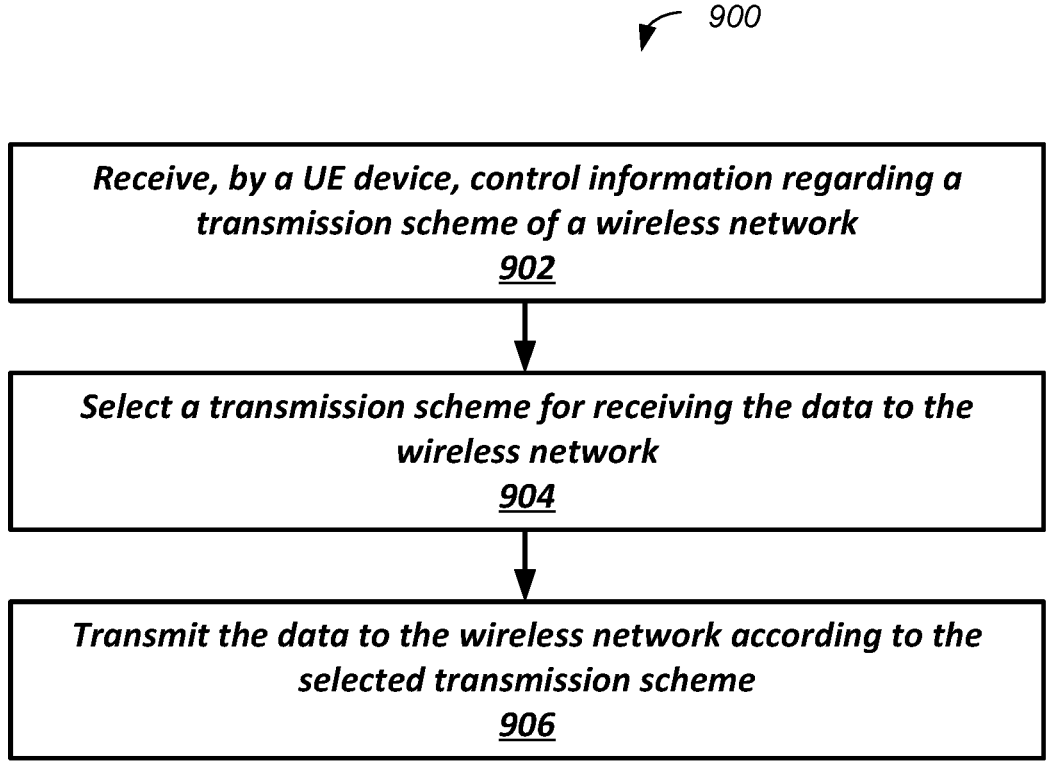

FIG. 8K shows an example process 900 for transmitting and/or receiving data over a wireless network. The process 900 can be performed by one or more of the devices described herein. As an example, the process 900 can be performed by a UE device 160 to transmit data to and/or receive data from a base station 102.

According to the process 900, a UE device receives control information regarding a transmission scheme of a wireless network (step 902). The control information includes at least an indication of a number of transmission configuration indication (TCI) states associated with the transmission, an indication of a number of code division multiplexing (CDM) groups associated with the transmissions, an indication of a number of repetitions of the transmitted data, and an indication of the transmission scheme of the wireless network.

The UE device selects a transmission scheme for receiving the data to the wireless network (step 904).

The UE device selects a first transmission scheme when the number of TCI states is two, the number of CDM groups is one, and the control information indicates the first transmission scheme for the wireless network. In some embodiments, the first transmission scheme can be a frequency division multiplexing (FDM) single transport block (TB) transmission scheme.

The UE device selects a second transmission scheme when the number of TCI states is two, the number of CDM groups is one, and the control information indicates the second transmission scheme for the wireless network. In some embodiments, the second transmission scheme can be an FDM dual TB transmission scheme.

The UE device selects a third transmission scheme when the number of TCI states is two, the number of CDM groups is one, and the control information indicates the third transmission scheme for the wireless network. In some embodiments, the third transmission scheme can be an intra-slot repetition TDM transmission scheme.

The UE device selects a fourth transmission scheme when the number of TCI states is two, the number of CDM groups is one, the number of repetitions by which to transmit the data is greater than one, and one of (i) the control information does not indicate the first, second, or third transmission schemes or (ii) the control information does not indicate a transmission scheme. In some embodiments, the fourth transmission scheme can be an inter-slot repetition TDM transmission scheme.

The UE device transmits the data to the wireless network according to the selected transmission scheme (step 906).

Figure 8L:

FIG. 8L shows an example process 910 for transmitting and/or receiving data over a wireless network. The process 910 can be performed by one or more of the devices described herein. As an example, the process 910 can be performed by a base station 102 to transmit data to and/or receive data from a UE device 160.

According to the process 910, a base station transmits, to a UE device, transmits, to a UE device, control information regarding a transmission scheme of a wireless network (step 912). The control information includes at least an indication of a number of transmission configuration indication (TCI) states associated with the transmission, an indication of a number of code division multiplexing (CDM) groups associated with the transmissions, an indication of a number of repetitions of the transmitted data, and an indication of the transmission scheme of the wireless network.

The base station receives, from the UE device over the wireless network, data according to a transmission scheme selected by the UE device (step 914).

The UE device selects a first transmission scheme when the number of TCI states is two, the number of CDM groups is one, and the control information indicates the first transmission scheme for the wireless network. In some embodiments, the first transmission scheme can be a frequency division multiplexing (FDM) single transport block (TB) transmission scheme.

The UE device selects a second transmission scheme when the number of TCI states is two, the number of CDM groups is one, and the control information indicates the second transmission scheme for the wireless network. In some embodiments, the second transmission scheme can be an FDM dual TB transmission scheme.

The UE device selects a third transmission scheme when the number of TCI states is two, the number of CDM groups is one, and the control information indicates the third transmission scheme for the wireless network. In some embodiments, the third transmission scheme can be an intra-slot repetition TDM transmission scheme.

The UE device selects a fourth transmission scheme when the number of TCI states is two, the number of CDM groups is one, the number of repetitions by which to transmit the data is greater than one, and one of (i) the control information does not indicate the first, second, or third transmission schemes or (ii) the control information does not indicate a transmission scheme. In some embodiments, the fourth transmission scheme can be an inter-slot repetition TDM transmission scheme.

User Privacy

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
    determining, by a user equipment (UE) device, one or more component carriers available to the UE device for receiving data over a wireless network; and
    transmitting, by the UE device to the wireless network, for each component carrier, an indication whether the UE device supports receiving data according to a multi-transmission and receiving points (multi-TRP) communication protocol,
    wherein for each component carrier, the indication whether the UE device supports receiving data according to the multi-TRP communication protocol comprises:
        a first data item, in a data structure FeatureSetDownlinkPerCC, indicating whether the UE device supports receiving data according to the multi-TRP communication protocol using that component carrier.

2. The method of claim 1, wherein according to the multi-TRP communication protocol, the UE device is configured to transmit a first instance of data to a first TRP of the wireless network, and transmit a second instance of data to a second TRP of the wireless network.

3. The method of claim 1, wherein according to the multi-TRP communication protocol, the UE device is configured to receive a first instance of data from a first TRP of the wireless network, and receive a second instance of data from a second TRP of the wireless network.

4. The method of claim 1, wherein for each component carrier, the indication whether the UE device supports receiving data according to the multi-TRP comprises:
    a second data item indicating a resource cost associated with receiving data using a control channel according to the multi-TRP communication protocol.

5. The method of claim 4, wherein the resource cost is an integer value.

6. The method of claim 4, wherein the resource cost is a non-integer value.

7. The method of claim 1, further comprising:
    transmitting, by the UE device to the wireless network, for each component carrier, an indication whether the UE device supports transmitting data according to the multi-TRP communication protocol.

8. A user equipment (UE) device comprising:
    one or more processors; and
    memory storing instructions that when executed by the one or more processors, cause the one or more processors to perform operations comprising:
        determining, by the UE device, one or more component carriers available to the UE device for receiving data over a wireless network; and
        transmitting, by the UE device to the wireless network, for each component carrier, an indication whether the UE device supports receiving data according to a multi-transmission and receiving points (multi-TRP) communication protocol, wherein for each component carrier, the indication whether the UE device supports receiving data according to the multi-TRP communication protocol comprises:
a first data item, in a data structure FeatureSetDownlinkPerCC, indicating whether the UE device supports receiving data according to the multi-TRP communication protocol using that component carrier.

9. The UE device of claim 8, wherein according to the multi-TRP communication protocol, the UE device is configured to transmit a first instance of data to a first TRP of the wireless network, and transmit a second instance of data to a second TRP of the wireless network.

10. The UE device of claim 8, wherein according to the multi-TRP communication protocol, the UE device is configured to receive a first instance of data from a first TRP of the wireless network, and receive a second instance of data from a second TRP of the wireless network.

11. The UE device of claim 7, wherein for each component carrier, the indication whether the UE device supports receiving data according to the multi-TRP comprises:
a second data item indicating a resource cost associated with receiving data using a control channel according to the multi-TRP communication protocol.

12. The UE device of claim 11, wherein the resource cost is an integer value.

13. The UE device of claim 11, wherein the resource cost is a non-integer value.

14. The UE device of claim 8, the operations further comprising:
transmitting, by the UE device to the wireless network, for each component carrier, an indication whether the UE device supports transmitting data according to the multi-TRP communication protocol.

15. One or more baseband processors configured to perform operations comprising:
determining one or more component carriers available to a user equipment (UE) device for receiving data over a wireless network; and
transmitting, to the wireless network, for each component carrier, an indication whether the UE device supports receiving data according to a multi-transmission and receiving points (multi-TRP) communication protocol,
wherein for each component carrier, the indication whether the UE device supports receiving data according to the multi-TRP communication protocol comprises:
a first data item, in a data structure FeatureSetDownlinkPerCC, indicating whether the component carrier supports receiving data according to the multi-TRP communication protocol using that component carrier.

16. The one or more baseband processors of claim 15, wherein according to the multi-TRP communication protocol, the UE device is configured to transmit a first instance of data to a first TRP of the wireless network, and transmit a second instance of data to a second TRP of the wireless network.

17. The one or more baseband processors of claim 15, wherein according to the multi-TRP communication protocol, the UE device is configured to receive a first instance of data from a first TRP of the wireless network, and receive a second instance of data from a second TRP of the wireless network.

18. The one or more baseband processors of claim 15, wherein for each component carrier, the indication whether the UE device supports receiving data according to the multi-TRP comprises:
a second data item indicating a resource cost associated with receiving data using a control channel according to the multi-TRP communication protocol.

19. The one or more baseband processors of claim 18, wherein the resource cost is an integer value.

20. The one or more baseband processors of claim 18, wherein the resource cost is a non-integer value.

21. The one or more baseband processors of claim 15, the operations further comprising:
transmitting, by the UE device to the wireless network, for each component carrier, an indication whether the UE device supports transmitting data according to the multi-TRP communication protocol.

* * * * *

UNITED STATES PATENT AND TRADEMARK OFFICE
CERTIFICATE OF CORRECTION

PATENT NO. : 12,199,702 B2  
APPLICATION NO. : 17/175231  
DATED : January 14, 2025  
INVENTOR(S) : Yushu Zhang et al.

Page 1 of 1

It is certified that error appears in the above-identified patent and that said Letters Patent is hereby corrected as shown below:

On the Title Page

Column 1, Line 1, Item (30) Delete "WO" and insert -- CN --;

In the Specification

Column 1, Line 3, Below "ENHANCEMENT" insert -- This application claims priority to International Application No. PCT/CN2020/074962, having an International Filing Date of February 12, 2020. The entire contents of the foregoing are hereby incorporated by reference. --.

Signed and Sealed this  
Eleventh Day of March, 2025

Coke Morgan Stewart  
*Acting Director of the United States Patent and Trademark Office*